United States Patent [19]
Basehore et al.

[11] Patent Number: 5,459,816
[45] Date of Patent: * Oct. 17, 1995

[54] FUZZY MICROCONTROLLER

[75] Inventors: Paul M. Basehore; Charles D. Watson, both of Sanford, Fla.

[73] Assignee: American Neuralogix, Inc., Sanford, Fla.

[*] Notice: The portion of the term of this patent subsequent to Sep. 14, 2010 has been disclaimed.

[21] Appl. No.: 893,093

[22] Filed: Jun. 3, 1992

Related U.S. Application Data

[63] Continuation-in-part of Ser. No. 712,871, Jun. 12, 1991, Pat. No. 5,245,695.
[51] Int. Cl.⁶ .................................................. G06F 15/00
[52] U.S. Cl. ............................ 395/3; 395/61; 395/900; 364/148
[58] Field of Search .............................. 395/3, 11, 900, 395/61; 364/148

[56] References Cited

U.S. PATENT DOCUMENTS 5,245,695  9/1993  Basehore .................................... 395/3

OTHER PUBLICATIONS

Zadeh, "Fuzzy Logic," Computer, Apr. 1988, pp. 83–93.
Togai et al, "Expert System on a Chip. An Engine for Real–Time Approximate Reasoning," IEEE Expert, Fall 1986, pp. 55–62.
Leung et al, "Fuzzy Concepts in Expert Systems" Computer, Sep. 1988, pp. 43–56.
Mizumoto et al, "Comparison of Fuzzy Reasoning Methods," Fuzzy Sets & Systems, 1982, vol. 8, pp. 253–283.

*Primary Examiner*—Robert W. Downs
*Assistant Examiner*—Tariq Hafiz
*Attorney, Agent, or Firm*—Cushman Darby & Cushman

[57] ABSTRACT

An arrangement (apparatus and method) using fuzzy logic controls a plurality of devices in response to inputs. The time-division-multiplexed input signals are demultiplexed and fuzzified according to predetermined fuzzy sets. Each crisp input is fuzzified by determining the distance of the crisp input from a center of the membership function of the fuzzy set and linearly complementing the result with respect to the width of the membership function, thereby eliminating the necessity for determining the shape of the membership function. The center may be a fixed value or a "floating" input. The fuzzified input signals are input to an asynchronous multipath feedforward network which determines a minimum rule term for each rule processed. The multipath feedforward network is dedicated to process the fuzzified input signals in parallel and to determine the minimum rule term using a minimum amount of circuitry. A maximum comparator circuit compares the minimum rule term of each rule corresponding to an output in order to determine the rule which provides the optimum output in response to the fuzzified inputs. An output register defuzzifies the output signal, time-division-multiplexes the output signals, provides feedback to the fuzzifier, and outputs the multiplexed output signals to the devices to be controlled. Other features include a timing generator which minimizes cycle times, a timer processor which provides time-variable inputs, and a keyboard controller.

15 Claims, 21 Drawing Sheets

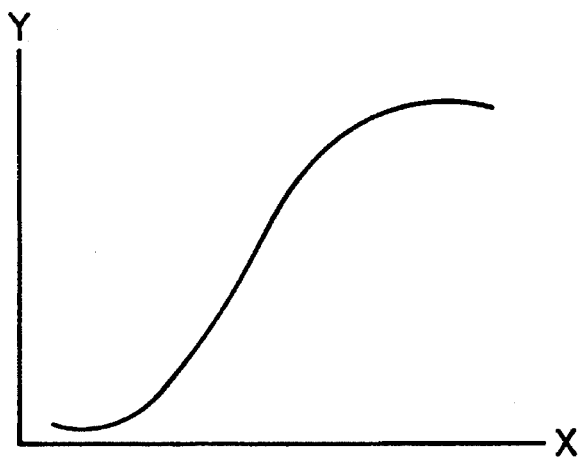
FIG. IA
(Prior Art)
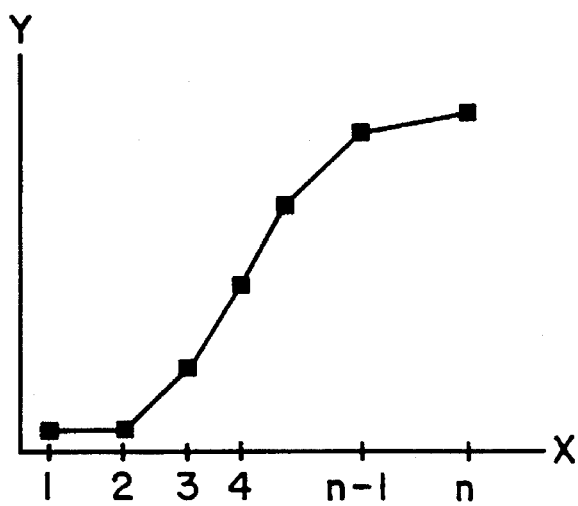
FIG. IB
(Prior Art)
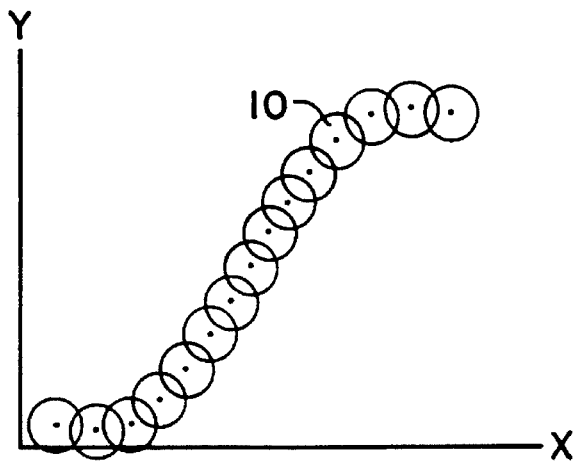
FIG. IC
(Prior Art)

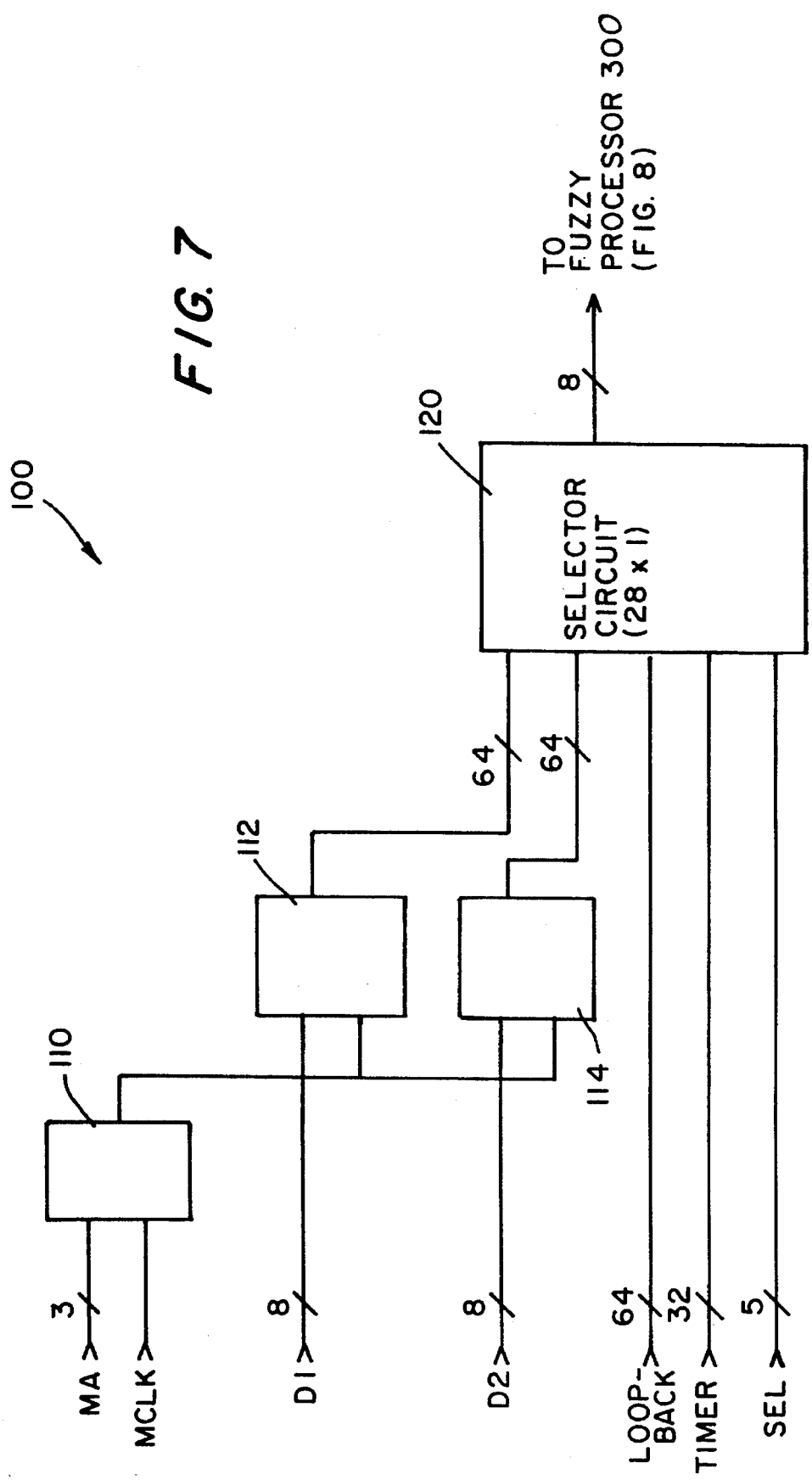

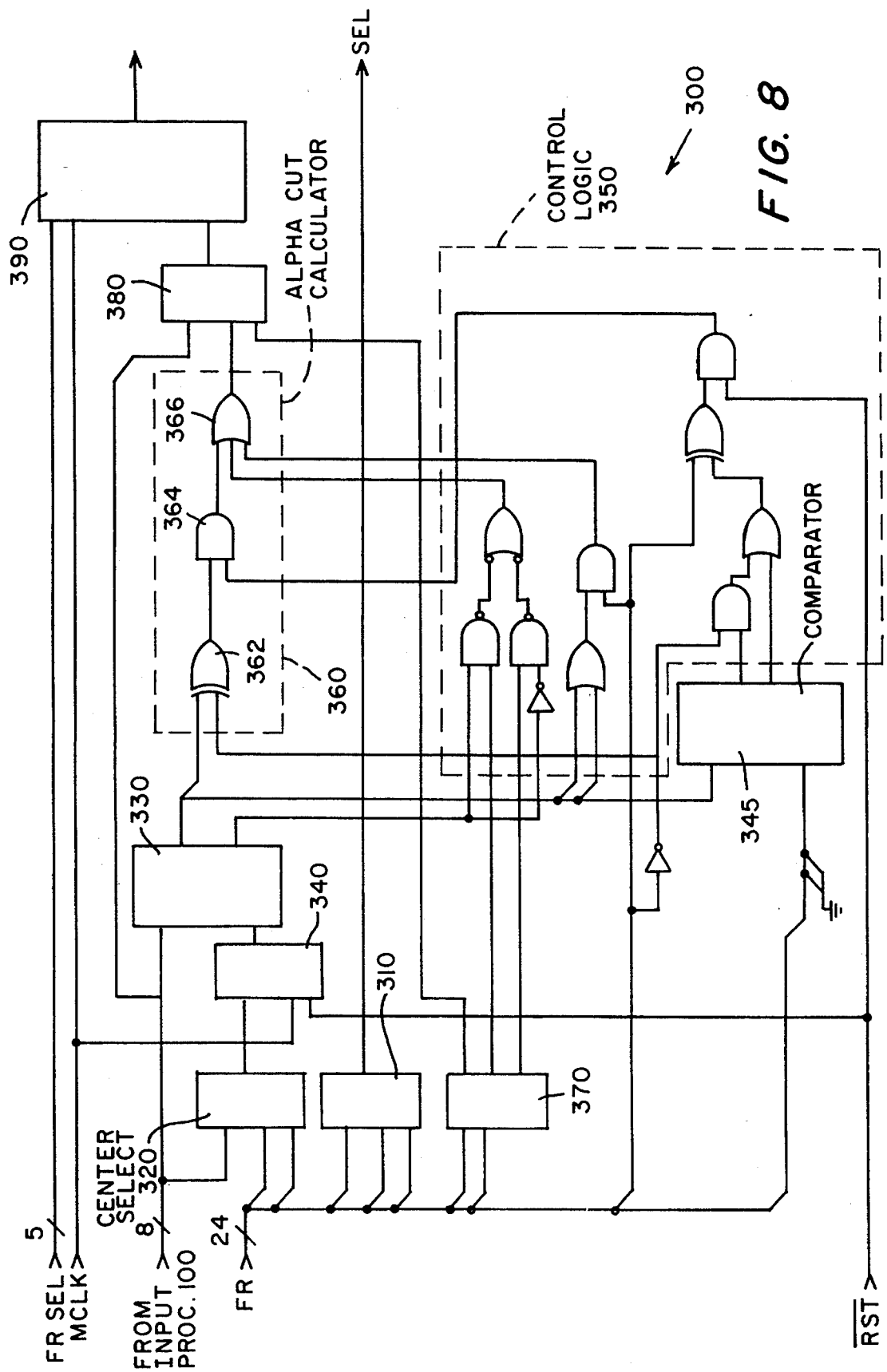

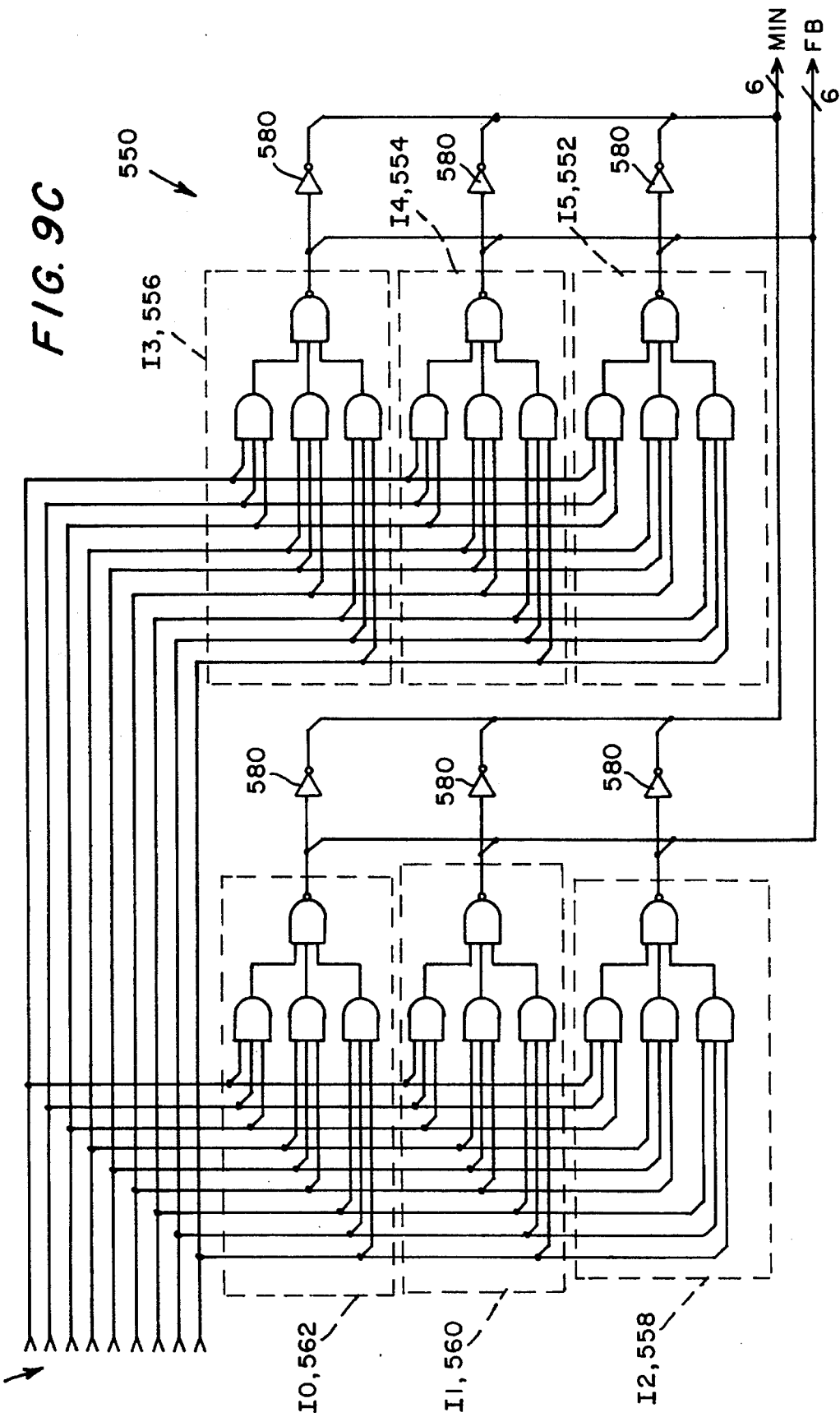

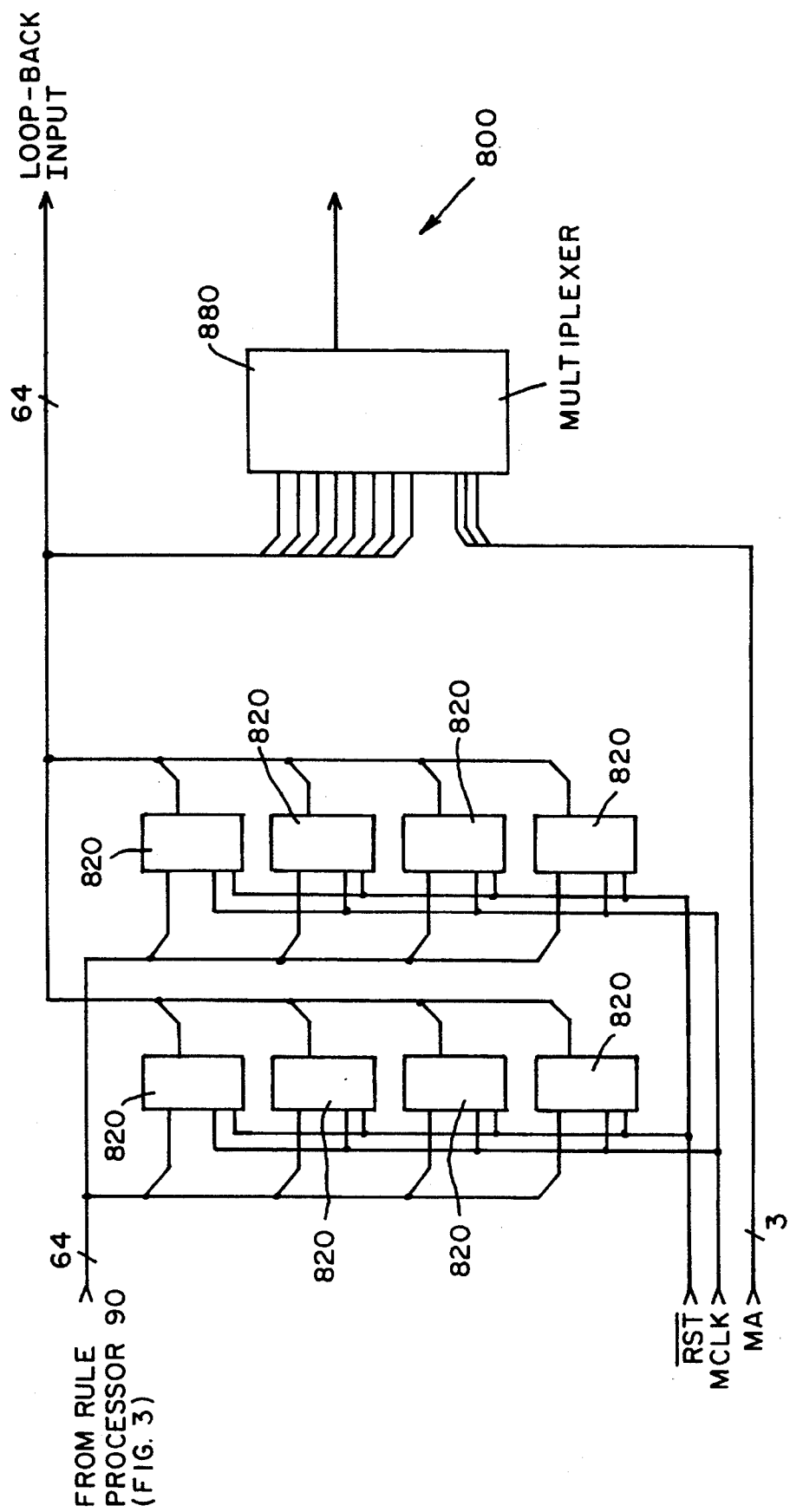

FUZZY MICROCONTROLLER

This application is a continuation-in-part of application 07/712,871, filed Jun. 12, 1991 now U.S. Pat. No. 5,245,695.

BACKGROUND OF THE INVENTION

1. Field of the Invention

The present invention relates to controllers and rule-based expert control systems using fuzzy logic and parallel processing for controlling devices.

2. Description of the Related Art

Control systems and computer-controlled electronic devices have historically been controlled by digital control systems. Such control systems use bi-state digital logic which requires a value of either "TRUE" or "FALSE" so that approximations are often required of real-world control problems. For example, an input/output relationship $y=f(x)$ would be specified either as a mathematical function or as a series of points using, for example, a look-up table: the former use of a mathematical function may require complex mathematics to accurately represent real-world control problems; further, the latter use of a look-up table, such as a ROM, introduces problems such as large memory requirements for adequate approximation, the concomitant addressing function associated with large memories, as well as interpolation problems.

For example, FIG. 1A shows an exemplary nonlinear sigmoidal function $y=f(x)$. If digital logic was used to characterize the function $y=f(x)$, it would be necessary to approximate the function shown in FIG. 1A by using discrete values, $y_i=a_i \cdot x_i (i=1, 2, \ldots, n)$, as shown in FIG. 1B. Since the number n of "crisp" values is limited, there inherently exists an interpolation error for values of x between $x_i$ and $x_{i+1}$. The term "crisp" refers to an input having a single discrete value. In addition, it becomes impractical to write a rule for every input combination where there exists a large number of inputs whose values can cover a wide input range.

An alternative approach to control theory, known as "fuzzy logic" was developed by L Zadeh in 1963. Rather than evaluating the two values "TRUE" and "FALSE" as in digital logic, fuzzy terms admit to degrees of membership in multiple sets so that fuzzy rules may have a continuous, rather than stepwise, range of truth of possibility. For example, in applying fuzzy logic, a person need not strictly be included or excluded as a member from a set of "tall persons"; rather, to the extent a person may be "tall" to a greater or lesser degree, the member is assigned to the set with a degree of membership between the values of "1" and "0".

FIG. 1C illustrates the principle of fuzzy logic in evaluating the function illustrated in FIG. 1A. The function $f(x)$ is approximated by a plurality of fuzzy sets 10 which overlap. Rather than approximating a continuous value x by a discrete value $x_i$, fuzzy logic determines for a given value x whether the value x is nearest to the center of a fuzzy set 10. If an x value is equidistant from two or more fuzzy sets, the resultant y value can be made proportional to the output values suggested by all the fuzzy sets of which the value x is a member. Thus, a fuzzy number may be two dimensional, having assigned fuzzy sets and corresponding membership values.

Since fuzzy logic can operate within the relative imprecision of the real-world environment, the advantages of fuzzy logic and fuzzy set theory have become apparent in numerous areas, such as robotics, natural language recognition, the automobile and aircraft industry, artificial intelligence, etc. Exemplary publications describing the theory and applications of fuzzy logic include Devi, B. B. et al., Estimation of Fuzzy Memberships from Histograms, Information Sciences, vol. 35, 1985, pp. 43–59; Braae, M. et al., Theoretical and Linguistic Aspects of the Fuzzy Logic Controller, Automatica, vol. 15, issue 5, 1979, pp. 553–77; Ralston, P. A. S., Fuzzy Logic Control of Machining, Manufacturing Review, vol. 3, no. 3, September 1990, pp. 147–154; Schwartz, Tom J., Fuzzy Tools for Expert Systems, AI Expert, February 1991, pp. 34–41; Kohoutek, H. J., Practice of Approximate Reasoning, Proceedings of Manufacturing International '90 (1990: Atlanta, Ga.) Vol. V: Design, Reliability, and Education of Manufacturability; Lee, Chuen C., Fuzzy Logic in Control Systems: Fuzzy Logic Controller—Parts I & II, IEEE Transactions on Systems, Man and Cybernetics vol. 20, issue 2, March/April 1990, pp. 404–418, 419–435; Mamdani, E. H., Application of Fuzzy Algorithms for Control of Simple Dynamic Plant, Proceedings of the IEEE, vol. 121, issue 12, December 1974, pp. 1585–1588; Tang, K. L. et al., Comparing Fuzzy Logic with Classical Controller Designs, IEEE Transactions on Systems, Man and Cybernetics, vol. 17, issue 6, November/December 1987, pp. 1085–1087; Zadeh, L. A., Fuzzy Sets, Information and Control, vol. 8, 1965, pp. 338–353; Zadeh, L. A., Outline of a New Approach to the Analysis of Complex Systems and Decision Processes, IEEE Transactions on Systems, Man and Cybernetics, vol. 3, issue 1, January 1973, pp. 28–44; and Ruspini, Enrique H., On the Semantics of Fuzzy Logic, International Journal of Approximate Reasoning 1991, vol. 5, pp. 45–86. These publications, which describe in detail the theory of fuzzy logic, are incorporated herein by reference.

The implementation of fuzzy logic for a controller has been suggested by Ralston et al. (1990). As shown in FIG. 2, a "universe of discourse" (e.g., a dimension of continuous values) is defined in step 20 for input and control variables. Membership functions are then defined in step 22 which determine the way observations of the variables are expressed as fuzzy sets. In other words, the fuzzy sets, which are subsets of the universe of discourse, are defined by their respective membership functions. A rule base is then formulated or constructed in step 24 to supply the logic that relates observations applied to the controller input to the required fuzzy control statements; a rule may have the format "IF (Alpha IS SMALL) AND (Beta IS MEDIUM) THEN Gamma IS BIG". A computational unit is then designed in step 26 that uses the rule base to logically obtain control statements from the fuzzy inputs; the computational unit will provide fuzzy outputs in response to the process observations, e.g., the fuzzy inputs. Finally, an action interface is defined in step 28 which will provide rules to translate fuzzy control statements into discrete, crisp values for the input variables applied to the input of the controlled device or process.

The implementation of fuzzy logic in control systems, while promising, has encountered numerous problems. For example, the construction of membership functions may be relatively difficult: the optimum membership function is related to sensor characteristics, control responses, and other dynamic factors. Thus, the determination of the optimum membership function in some cases may only be accomplished empirically. This difficulty in determining the membership function translates into the problem of properly classifying an input into the corresponding fuzzy set.

An additional problem of current fuzzy control systems is that the computational processing of the fuzzy logic is performed using conventional sequential processing via a microprocessor.

Such microprocessor-based systems use the classic von-Neumann architecture. Thus, the processing speed of the control system is limited by the processing speed of the microprocessor: this "von-Neumann bottleneck" severely limits processing speed as the required number of processing operations increases.

Highly parallel architectures which are faster than the von-Neumann architecture have recently been proposed by Lippman (1987). While these neural net classifiers are faster than the classic von-Neumann machine, the relatively large number of parallel connections in the neural net increases the size of an IC chip, and thus increases the overall cost of the system.

The fuzzy logic systems to date have only been implemented having a relatively small number of inputs. A fuzzy logic microcontroller must have the capacity to handle a large number of inputs, function in accordance with a large number of rules and provide an adequate number of outputs.

Further, more advanced applications of fuzzy logic may require a fuzzy logic microcontroller capable of processing complex membership functions that have varying parameters. For example, a fuzzy logic application may have a fuzzy set having a membership function that varies with respect to time or a given input parameter. Thus, unless the membership function can be defined on the basis of the varying parameter, the definition of the membership function Would need to be continually updated during processing, thereby adding substantial complexity to the fuzzifying process.

The fuzzy microcontroller in copending application 07/712,871 fuzzified a number of inputs and determined an optimum rule from a set of rules corresponding to an output. The optimum rule had a corresponding action value which was either output directly in an immediate mode or added as an offset to the previous output value in an accumulate mode: this step was known as defuzzifying the output signal. However, different fuzzy logic applications may have different desired outputs. For example, the copending application 07/712,871 disclosed an application combining a plurality of fuzzy microcontrollers by coupling the output of one microcontroller to the input of a second microcontroller; it would be desirable to directly output the fuzzy results of the first microcontroller as raw data for the second microcontroller. Further, it would be desirable to provide an output mode which outputs a result based upon the average of all the rules considered valid during the determination of the optimum rule.

Finally, the fuzzy microcontroller of copending application 07/712,871 cycled through a predetermined number of inputs during the fuzzification of the inputs using a predetermined number of fuzzifiers and a predetermined number of rules, regardless of the needs of the application. Consequently, the fuzzy microcontroller of copending application 07/712,871 would have the same throughput even if only one fuzzifier or one rule was being processed. It would be desirable to provide a timing system that minimized processing time by utilizing only those fuzzifier registers and rule registers necessary for processing.

SUMMARY OF THE INVENTION

It is an object of the present invention to provide a low cost fuzzy logic microcontroller for efficient performance in cost-critical control systems.

It is a further object of the present invention to provide a fuzzy logic microcontroller which is easily implemented for desired control applications.

It is still a further object of the present invention to provide a fuzzy logic microcontroller which has an efficient processing capacity to generate control signals in response to a large number of inputs with minimum throughput.

It is still another object of the present invention to provide a fuzzy logic microcontroller which has flexible processing capabilities for complex fuzzy logic applications.

In order to achieve these and other objects of the present invention, a fuzzy logic microcontroller includes several advantageous features which together provide efficient processing from a large number of inputs. The inputs are time-division multiplexed (TDM) signals, for example, from sensors, which are input to a fuzzifier input selector, also known as an input processor. The fuzzifier input selector separates the TDM signals and prepares the separated signals for fuzzification by the fuzzifier, also known as a fuzzy processor, which determines a membership value for that input. After fuzzification, the fuzzified input signals are processed by a rule processor including a multipath feedforward network designed for higher processing speeds using a minimum number of components. The multipath feedforward network processes the fuzzified input signals in accordance with predetermined fuzzy logic rules established in accordance with the control system output parameters. The processed data is then output to the respective devices to be controlled in accordance with a selected output mode.

The input processor according to the present invention receives a plurality of external and internal inputs. The external inputs preferably include at least two TDM input lines, which may be either analog or digital. The internal inputs preferably include a feedback input and a timer input. The input processor selects one of the inputs in response to an input select signal from the fuzzy processor and outputs the selected input to the fuzzy processor, also known as a similarity circuit.

The present invention provides a fuzzification method which provides a simple technique for determining the similarity of the crisp input (e.g., the discrete demultiplexed signal undergoing fuzzification) to a fuzzy set. The degree of similarity between the crisp input and the fuzzy set is defined by a membership function $\mu$. The fuzzification method according to the present invention disregards the shape of the membership function $\mu$ and instead determines the distance of the crisp input from a defined center of the membership function $\mu$; the distance of the crisp input is then linearly complemented with respect to the width of the membership function $\mu$ so that the resulting similarity signal is a maximum when the distance is a minimum, and, conversely, a minimum when the distance is a maximum (e.g., when the crisp input exceeds the width of the membership function $\mu$).

Since the shape of the membership function is not used in the similarity determination, the designer of a control system no longer needs to be concerned with the optimum membership function shape or its effects due to sensor characteristics, control responses, or other dynamic factors. As a result, the fuzzification process according to the present invention is simpler to implement while retaining flexibility for variations in control systems.

The fuzzification method according to the present invention is implemented by the fuzzy processor, also known as the similarity circuit. The fuzzy processor fuzzifies the input from the input processor in accordance with a corresponding fuzzifier register to obtain a fuzzified input signal. Specifically, the fuzzy processor outputs the input select signal in accordance with the contents of the corresponding fuzzifier register to the input processor. The fuzzy processor receives the selected input from the input processor and performs the similarity determination according to one of a plurality of modes stored in the fuzzifier register. The fuzzified input signal is then stored in a fuzzy data register. After all the necessary inputs have been fuzzified, the fuzzifier register simultaneously outputs all the fuzzified inputs to the rule processor.

A particular advantage of the present invention is that the fuzzifier register may either store a fixed center value for the corresponding membership function or may assign an input source to be a center value. The assignment of an input source to be a center value causes the corresponding membership function to have a variable, or "floating" center. Thus, if a center is to be floating, the fuzzy processor outputs the input select signal to the input processor in order to obtain both the crisp input value and the floating center. Since an input may either be an external signal, a feedback signal or an internal timing signal, the use of such floating centers are particularly effective in applications requiring time-variable membership functions, as well as applications comparing two changing inputs to determine a differential or to eliminate a noise component.

The fuzzified input signals are processed by the rule processor which processes the fuzzified input signals in accordance with predetermined fuzzy logic rules established in accordance with control system output parameters. An output of the fuzzy microcontroller will be determined on the basis of its predetermined rules and the fuzzified input signals. A rule determines which of the fuzzified input signals are to be compared when processing the rule. The rule terms for each rule are implemented in the multipath feedforward network, also known as a minimum comparator, which determines in parallel the fuzzy input signals which represent the minimum value term in the rule. The rule processor also includes a maximum comparator which compares each of the minimum value terms for each rule to determine which rule provides the optimum output given the fuzzified inputs.

Since the multipath feedforward network according to the present invention is specially dedicated to determine a minimum, or maximum, rule term for each rule to be processed, the multipath feedforward network can process a plurality of selected fuzzified inputs for a given rule in parallel. Therefore, since a rule can be processed during each cycle of the network, the present invention enables extremely rapid rule processing on the order of thirty million rules per second. In addition, the dedicated network can be designed for minimum use of silicon on a semiconductor chip, resulting in a lower cost for the semiconductor chip.

An additional feature of the multipath feedforward network is that minimum rule term determined for a rule being processed can be stored and compared with the next rule to be processed. Thus, rules can be concatenated to provide flexibility in processing fuzzy logic rules having a large number of fuzzy inputs.

The rule processor also includes a keyboard controller to enable rule processing using an external keyboard. The rule processor both controls the keyboard and receives data from the keyboard via one of the two input TDM lines. If the rule processor determines a predetermined key has been pressed, a signal is sent to the multipath feedforward network and processed. As a result, the fuzzy microcontroller of the present invention enables fuzzy applications requiring user input to be performed without a separate controller.

The rule processor also includes a rule mode processor which outputs the desired output data in accordance with an output mode of the corresponding winning rule. According to the present invention, there are four preferred output modes: Immediate, Accumulate, Max-of-Min and Weighted Average. For example, in the Accumulate mode, the action value corresponding to the winning rule adds an offset to the existing output data, and outputs the resulting output signal to a device to be controlled. The Max-of-Min mode outputs the actual minimum value of the winning rule from the minimum comparator, which can serve as raw data when a plurality of fuzzy microcontrollers are connected, thereby improving processing efficiency or troubleshooting efforts. The Weighted Average mode effectively offers a fuzzy output by modifying the output by the average of all actions of all corresponding rules where a membership function was considered valid. Thus, the output is a more accurate response to the input data.

Another feature of the present invention is the use of timing generators to control the timing of I/O processing, fuzzifier processing and rule processing. The timing generators ensure that throughput is maintained at a minimum based upon the number of fuzzifiers and rules being processed. Specifically, the timing generators of the present invention cycle the fuzzy microcontroller for only those fuzzifiers and rules being processed, so that after the last fuzzifier and rule has been processed, the fuzzy microcontroller resets and continues processing the first fuzzifier and rule, respectively. Further, the timing generator defines an I/O timeslot on the basis of the maximum number of clock cycles needed to process the given number of fuzzifiers or rules, whichever is greater. Thus, the throughput of the fuzzy microcontroller is optimized to maximize processing speed with respect to those fuzzifiers and rules being processed.

Alternatively, the fuzzy microcontroller may be operated in a batch processing mode, whereby I/O processing is controlled by an external signal. Thus, the fuzzy microcontroller may be externally controlled to provide "single step" I/O processing.

Thus, the present invention provides a unique fuzzy microcontroller which enables rapid processing of a plurality of inputs using fuzzy logic and which is relatively simple and inexpensive to implement for fuzzy control systems.

As a result, the present invention provides a new and inexpensive system of control for applications such as smart appliances, pattern matching, sequencers, state machines and timers, automotive applications, robotics, approximate reasoning, or expert systems.

The features of the present invention will become more readily apparent from the below detailed description and the accompanying drawings.

BRIEF DESCRIPTION OF THE DRAWINGS

Reference is made to the attached drawings, wherein elements having the same reference numeral designations represent like elements throughout, and wherein:

FIGS. 1A, 1B and 1C illustrate the logical distinctions between digital logic and fuzzy logic;

FIG. 7 discloses a block diagram of the input processor of FIG. 3;

FIG. 8 discloses block diagram of the fuzzy processor of FIG. 3;

FIGS. 9A, 9B and 9C disclose the minimum comparator of FIG. 3;

FIG. 11 discloses a block diagram of the output processor of FIG. 3;

DETAILED DESCRIPTION OF THE PREFERRED EMBODIMENT

Figure 2:
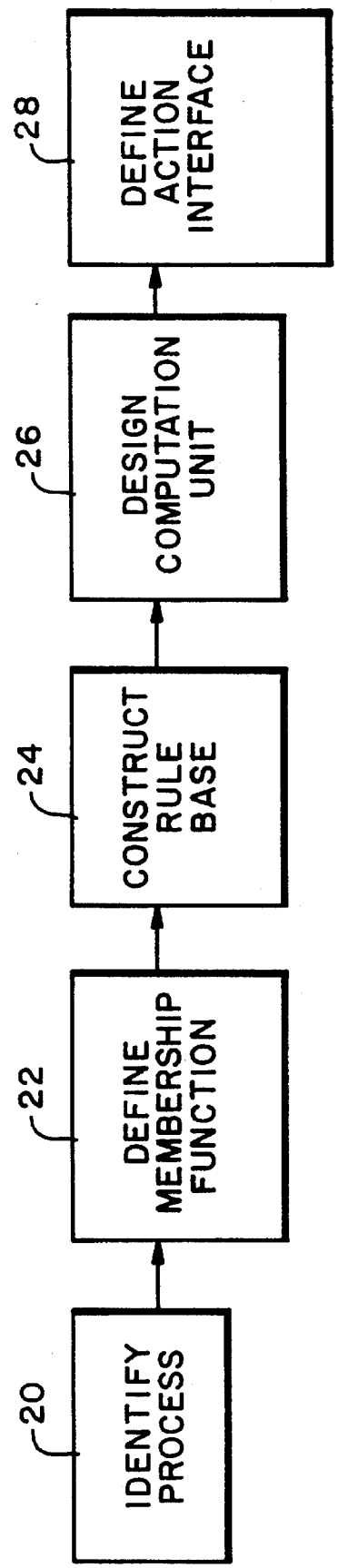
FIG. 2 discloses a conventional method for fuzzy logic in a controller.

The preferred embodiment of the present invention will now be described with reference to the accompanying drawings, FIG. 3 discloses a block diagram of the fuzzy microcontroller according to a preferred embodiment of the present invention and designated generally by the reference character 50, The fuzzy microcontroller 50 may control a plurality of devices by outputting an output signal DO to a corresponding controlled device (not shown in FIG. 3), The value of the output signal DO is determined by the rules associated with the output signal and the signals input to the fuzzy microcontroller 50. In other words, each output signal is the result of a predetermined set of rules which define the action to be taken by the output signal under certain input conditions. The fuzzy microcontroller 50 of the present invention compares the input signals to each of the rules, one rule at a time, to determine which rule will provide the optimum output.

Figure 3:
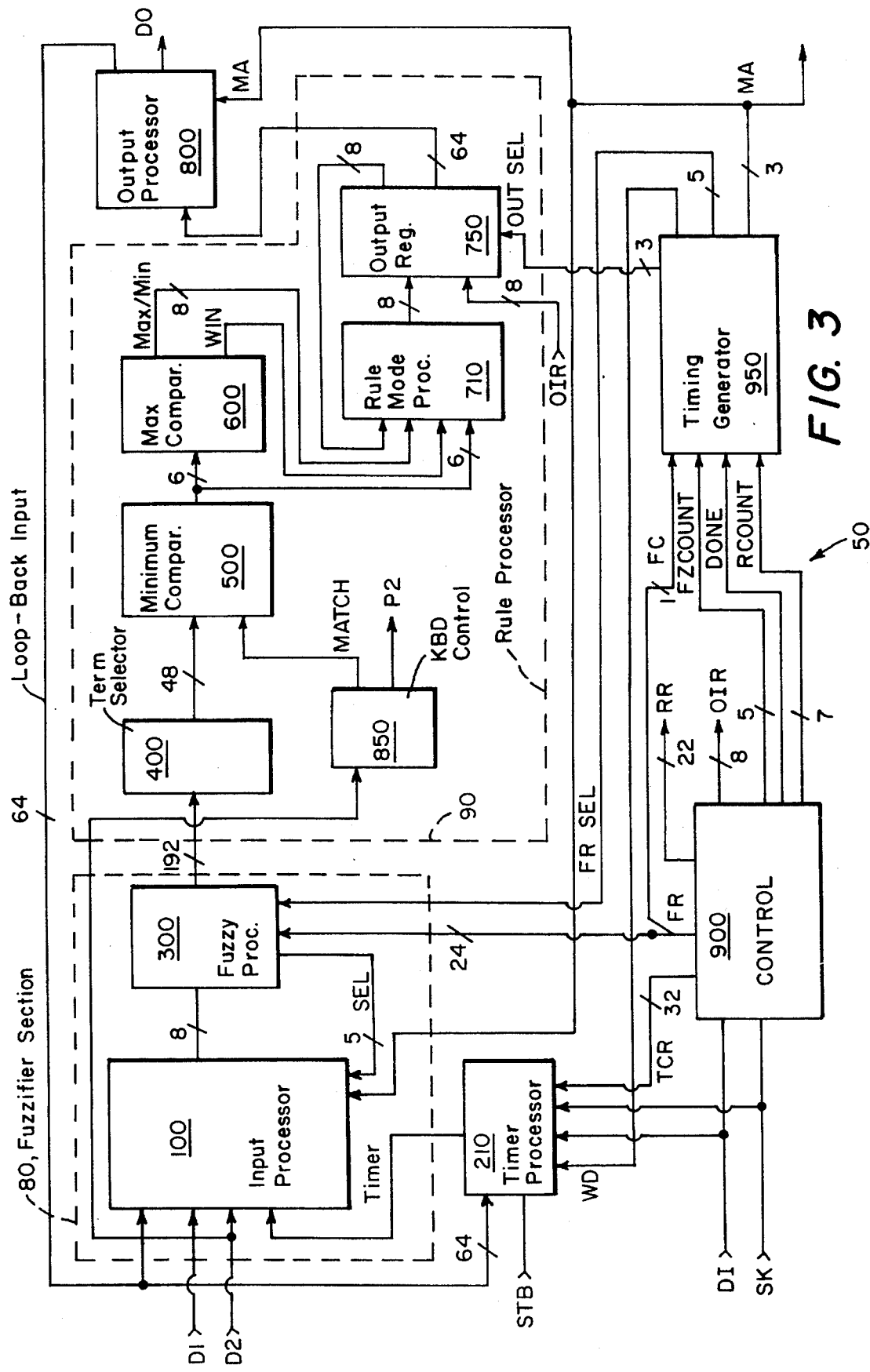
FIG. 3 discloses a block diagram of the fuzzy microcontroller according to a preferred embodiment of the present invention.

As shown in FIG. 3, the fuzzy microcontroller 50 includes a fuzzifier section 80 having an input processor 100, also known as a fuzzifier input selector, and a fuzzy processor 300, also known as a similarity circuit. The input processor 100 preferably receives at least two time-division-multiplexed (TDM) input signals from external sources D1 (port 1) and D2 (port 2), respectively. The external source may be a multiplexer (not shown) which time-multiplexes a plurality of sensor signals, for example. Although the input signal may be either analog or digital, the preferred embodiment uses an eight (8) bit digital word so that the fuzzifier input selector 100 receives a data stream of 8-bit digital input signals from each of the external sources D1 and D2. One of ordinary skill in the art will realize that the input processor 100 can accommodate analog TDM inputs by including an 8-bit A/D converter.

The fuzzifier input selector 100 receives the 8-bit TDM signals from the external multiplexer (not shown) with handshaking being performed between the external multiplexer and a timing generator circuit 950 using a sync signal (not shown) and a three-bit multiplexer address signal (MA). The input processor 100 includes means for demultiplexing each of the input lines D1 and D2, such as an eight-to-one demultiplexer or an input register for each input line D1 and D2. Thus, each of the 8-bit input signals are time-discriminated by the TDM signal and then latched internally. The input processor 100 also receives a loop-back input from an output processor 800, and a timer output (TIMER) from a timer processor 210. The input signals are selectively output to the fuzzy processor 300 in accordance with a five-bit input select signal (SEL) from the fuzzy processor 300 (see description of FIGS. 4 and 8 below).

The selected input signals are supplied sequentially as eight-bit digital signals to the fuzzy processor 300 for fuzzification in accordance with corresponding fuzzy set parameter data. The fuzzy set parameter data is supplied via a signal line (FR) from the control circuit 900. The signal path (FR) represents the data from one of thirty-two (32) fuzzy registers located in a control circuit 900 (see discussion of FIG. 4 below). The fuzzified signals are latched in an internal latch (see discussion of FIG. 8 below). After all the selected input signals have been fuzzified, the latched data is simultaneously output from the fuzzy processor 300 of the fuzzifier section 80 to a rule processor 90.

The rule processor 90 determines the optimum rule for a corresponding output based upon the fuzzified inputs and outputs a value for that corresponding output in accordance with the determined optimum rule. Consequently, the rule processor 90 processes the fuzzified inputs under the control of the rule parameters supplied from the twenty-two bit signal path (RR) from the control circuit 900. The signal path (RR) represents the data from one of one hundred twenty eight (128) rule registers located in the control circuit 900 (see discussion of FIG. 4 below).

The rule processor 90 includes a term selector 400, which selects one of eight groups of fuzzified inputs for processing by a minimum comparator 500. The term selector 400 selects one of the eight groups of fuzzified inputs in response to a three-bit Map word from the signal path (RR) from the control circuit 900. Each group of fuzzified inputs has eight fuzzy inputs, thereby enabling the term selector 400 to group together a plurality of fuzzy inputs during processing. As a result, the fuzzy inputs corresponding to a single rule can be grouped together for simultaneous processing.

The minimum comparator 500 processes in parallel the selected group of fuzzy inputs in accordance the rule being processed from the signal path (RR). The minimum comparator 500 determines whether the fuzzy logic rule has a likelihood of being executed on the basis of the fuzzified input signals. For example, a rule may be of the form "IF (Temp IS HOT) AND (Beta IS VERY_HUMID) AND (Motor IS LOW) THEN INCREMENT Motor BY BIG_INCREASE". Each of the terms (e.g., "Temp IS HOT") of the rule is compared with the corresponding fuzzy input (e.g., "Temp") to determine whether there is a low or high correlation. The correlations of each of the rule terms are then compared to determine the minimum level of correlation amongst the rule terms. The minimum rule term (e.g., the rule term having the minimum level of correlation) represents the overall likelihood of the rule being executed on the basis of the fuzzified input signals. The minimum comparator 500 determines the minimum rule term for each rule sequentially, for example, one rule at a time. As described in detail below with respect to FIGS. 9A, 9B and 9C, the minimum rule term can be saved and applied to the subsequent rule being processed, thereby concatenating a plurality of rules to determine the minimum rule term.

The minimum comparator 500 outputs the minimum rule term to a maximum comparator 600 and a rule mode processor 710. The maximum comparator 600 compares the minimum rule term of the selected rule with the minimum rule terms of other corresponding rules and identifies the rule which has the maximum value for the minimum rule term. As described in detail below, the maximum comparator 600 outputs a WIN signal to the rule mode processor 710 whenever a new winning rule has been determined. The maximum comparator 600 also outputs the maximum value for the minimum rule term of the corresponding winning rule to the rule mode processor 710 on an eight-bit signal path (Max/Min).

The rule mode processor 710 receives the action value of a processed rule on the RR signal path, the WIN signal from the maximum comparator 600, the maximum value for the minimum rule term of the corresponding winning rule on the (Max/Min) signal path, the six-bit minimum rule term from the minimum comparator 500, and a feedback signal from an output register 750. As described in detail below, the rule mode processor 710 outputs a result for the winning rule in accordance with one of the following selectable modes: Immediate, Accumulate, Max-of-Min and Weighted Average. The mode is selected in accordance with the OUT MODE parameter from the rule register signal path (RR) from the control circuit 900.

The output register 750 is initialized by data from one of eight 8-bit output initialization registers (OIR) located in the control circuit 900 (see discussion of FIG. 4 below). The output register 750 is controlled by a three-bit outselect signal (OUTSEL) from the timing generator 950. The outselect signal is a decoder address signal which causes the output register 750 to latch the data from the rule mode processor 710 for the corresponding output. The output register 750 thereafter outputs the eight modified 8-bit output values on a 64-bit signal path to the output processor 800.

The rule processor 90 also includes a keyboard controller 850. The keyboard controller 850 is used as an interface to an external keypad whenever one of the rule registers stored in the control circuit 900 is configured to operate in a keypad mode. Port 2 of the fuzzy microcontroller is a bidirectional double-buffered input/output bus shared by the input signal path D2 and the output P2 from the keyboard controller 850. Thus, port 2 receives input data from source D2 and outputs strobe data via the output P2, which is coupled to the upper four bits of the output bus of port 2.

The rule in the keypad mode outputs on the signal path (RR) control data and strobe data. The strobe data is output by the keyboard controller 850 via the four-bit signal line.

The keyboard controller 850 receives the lower four bits of the input signal path D2 of the bidirectional bus and determines whether a key was pressed, and if so, which key was pressed. If the keyboard controller 850 determines that a "match" has occurred, a signal (MATCH) is output to the minimum comparator 500 for processing. The detailed operation of the keyboard controller 850 is discussed below with reference to FIGS. 9A–9C and FIG. 12.

The output of the rule processor 90 is supplied to the output processor 800. The output processor 800 outputs the, modified output as an output signal to the device to be controlled. The output processor 800 also outputs a loopback input signal to the fuzzifier input selector 100 in the event a feedback system is desired. According to the preferred embodiment, the output signal of the output processor 800 is a TDM signal for eight (×8) output devices. Thus, the eight output signals are multiplexed into a single eight-bit TDM signal. The TDM signal is output in accordance with the multiplexer address signal (MA) from the timing generator 950. Although the TDM signal is an eight-bit digital signal, the TDM can be a TDM analog signal by adding a D/A converter to the output processor 800.

The control circuit 900 includes the thirty-two (32) 24-bit fuzzifier registers and outputs their contents to the fuzzy processor 300 via the signal path (FR). The control circuit 900 also includes the one hundred twenty-eight (128) 22-bit rule registers and outputs their contents to the rule processor 90 via the signal path (RR). The control circuit 900 also includes a 32-bit timer control register and outputs its contents to the timer processor 210 via the signal path (TCR). The control circuit 900 also is capable of receiving serial data from an external source via a signal path (DI) under the control of a serial clock input (SK).

The control circuit 900 also outputs a 5-bit signal (FZCOUNT) indicating the numbers of fuzzy registers used and a 7-bit signal (RCOUNT) indicating the number of rule registers used. As discussed in detail below, the timing generator 950 generates the necessary timing signals in accordance with the FZCOUNT and RCOUNT signals to minimize processing cycle times.

Other operations of control circuit 900 in managing the operation the fuzzy microcontroller 50 will be readily apparent to one of ordinary skill in the art.

Figure 4:
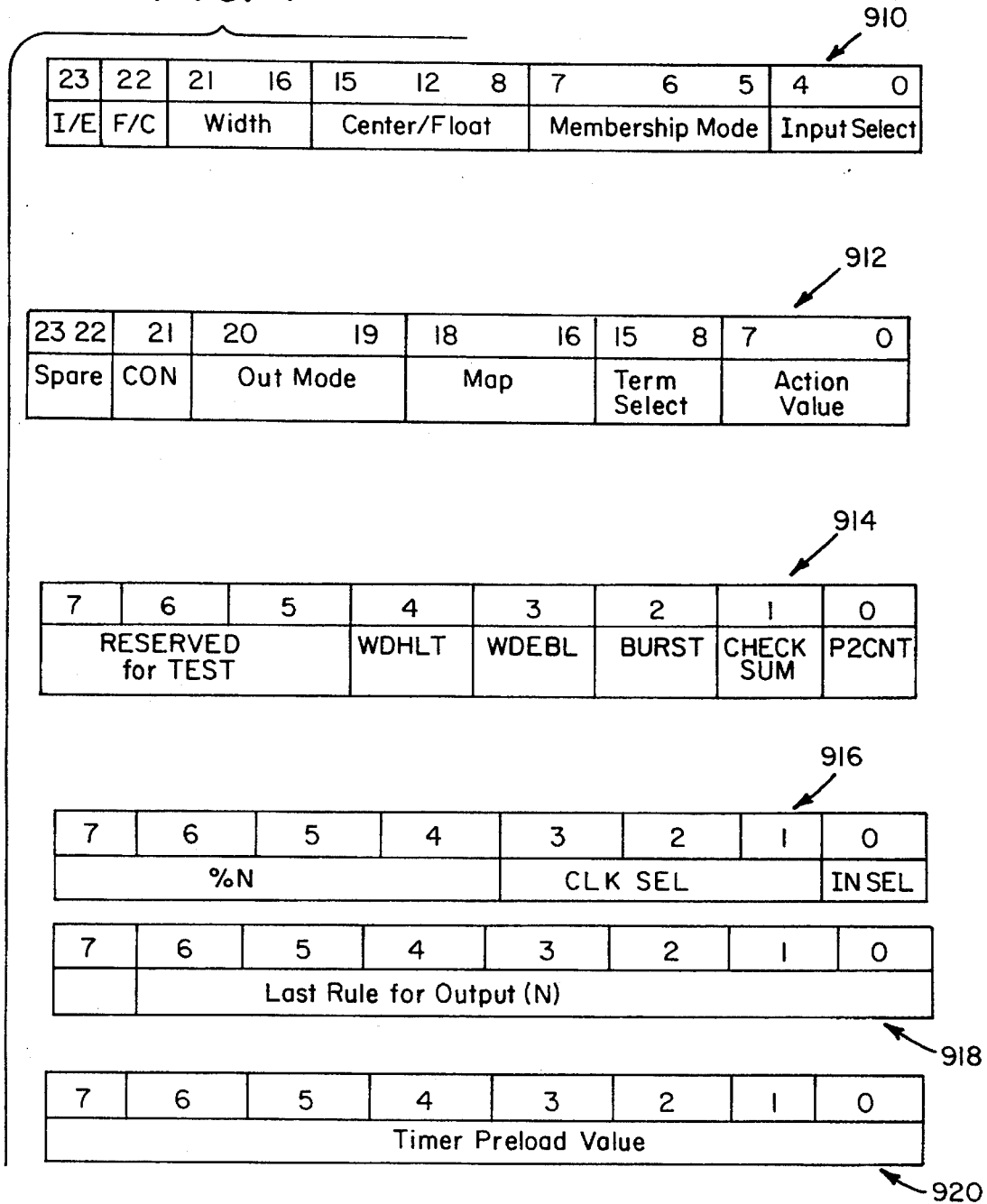
FIG. 4 illustrates exemplary registers located in the control unit of FIG. 3.

FIG. 4 shows exemplary registers located in the control circuit 900. The control circuit 900 preferably includes thirty-two (32) fuzzifier registers 910, one hundred twenty-eight (128) rule registers 912, a device configuration register 914, four (4) timer control registers 916, eight (8) output rule selection registers 918, and four (4) timer preload registers 920. Although not shown, the control circuit also includes eight (8) output initialization registers (OIR) and a check sum register (CSR).

The fuzzifier register 910 includes data supplied to the fuzzy processor 300 necessary to fuzzify input data according to a predetermined fuzzy set. As a result, the input fuzzifier register 910 corresponds to a predetermined fuzzy set. As shown in FIG. 4, bits 0–4 (Input Select) indicate the selected input to be fuzzified. According to the preferred embodiment, the Input Select value determines the selected input as shown in TABLE 1.

TABLE 1

| INPUT SELECTION VALUES | |
| --- | --- |
| Input Select Value | Input |
| 00 through 07 | Port 1 input 0 through Port 1 input 7 |
| 08 through 0F | Port 2 input 0 through Port 2 input 7 |
| 10 through 17 | Loopback Output 0 through Loopback output |

TABLE 1-continued
INPUT SELECTION VALUES

| Input Select Value | Input |
|---|---|
| | 7 |
| 18 through 1B | Timer 1 through Timer 4 |
| 1C through 1F | (Spare) |

Figure 6A:
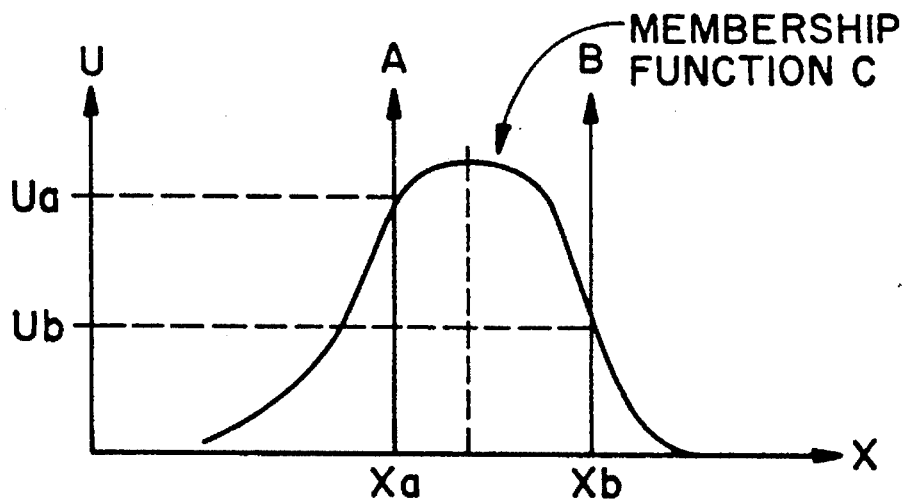
FIGS. 6A–6F illustrate exemplary relationships between a fuzzy set and a range of inputs on the basis of the membership function of the fuzzy set according to the fuzzifying method of the present invention.
Figure 6B:
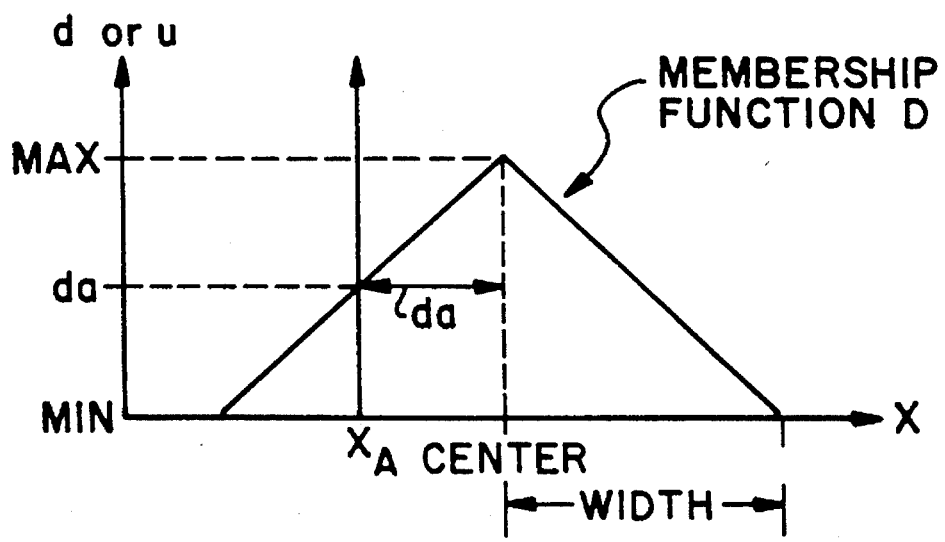
Figure 6C:
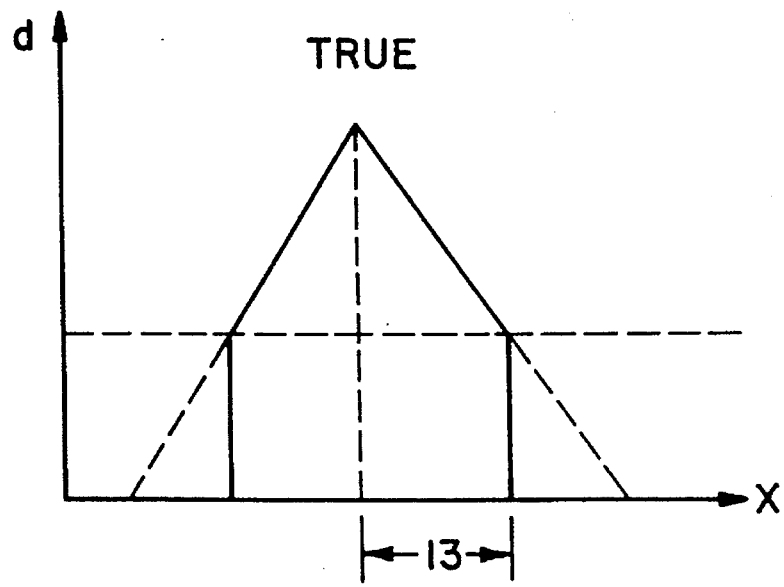
Figure 6D:
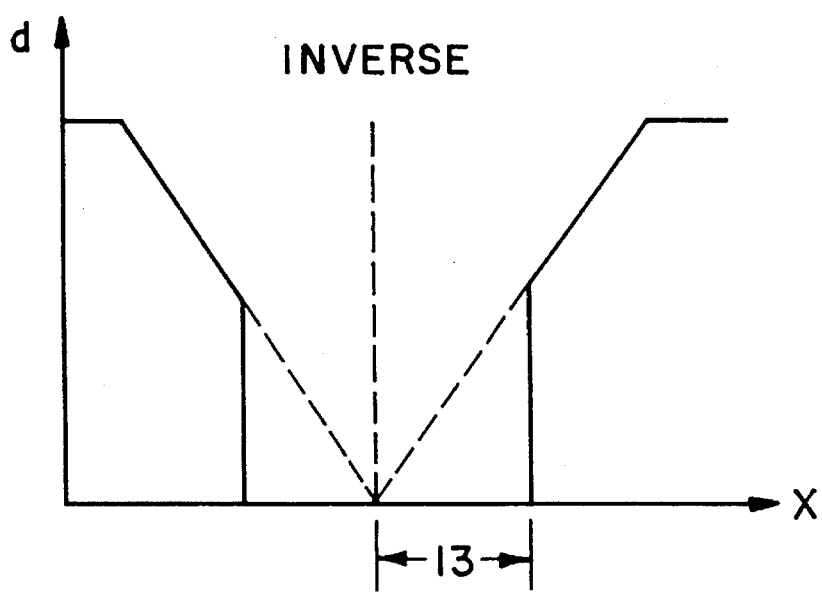
Figure 6E:
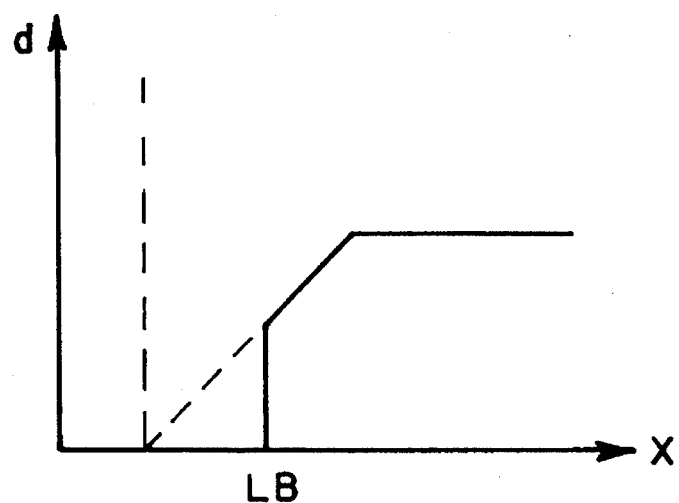
Figure 6F:
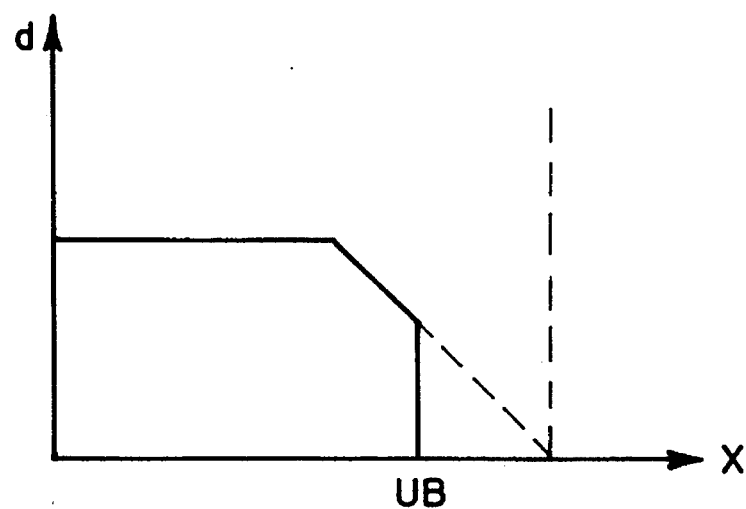

Bits 5–7 of the fuzzifier register 910 define the membership mode selected. As shown in FIGS. 6C–6F, different membership functions are available. For example, FIG. 6C shows a step membership function having a True (inclusive) polarity and FIG. 6D shows a step membership function having an Inverse (exclusive) polarity. FIGS. 6E and 6F show Greater Than and Less Than membership functions, respectively, each having True (inclusive) polarity. According to the preferred embodiment, the step membership function is selected when bits 5–7 equal zero (0); the Less Than membership function is selected when bits 5–7 equal one (1); the Greater Than membership function is selected when bits 5–7 equal two (2). A Pass mode is selected when bits 5–7 equal three (3): the Pass mode is desirable when a selected input is not to be fuzzified, and the fuzzification process needs to be bypassed. Finally, an End membership mode (selected when bits 5–7 equal seven (7)) is used to indicate that the last fuzzifier register has been accessed.

Bits 8–15 of the fuzzifier register 910 identify the center value of the corresponding membership function. If Bit 22 of the fuzzifier register 910 is set (F/C=1), the bits 8–15 store the actual center value. However, if Bit 22 of the fuzzifier register 910 is cleared (F/C=0), the bits 8–12 are used to select one of the previously-identified input sources as the center according to the format shown in Table 1 above.

Bits 16–21 of the fuzzifier register 910 define the width, namely the desired maximum distance from the center in order for an input to be considered a member of the fuzzy set.

The rule selection register 912 includes all necessary parameter data for a rule associated with an output. Bits 0–7 of the rule selection register 912 define an 8-bit signed integer action value to be applied when the corresponding rule is selected as a winning rule. The data bits 8–15 are referred to as the Term bits of the rule. Bits 16–18 are referred to as the Map bits of the rule. As shown below in TABLE 2, the Map bits select one of eight groups of fuzzifiers, whereby each group includes eight fuzzifiers. When the Map value is equal to seven (7), the rule is dedicated to keypad use (described in detail below). Thus, each of the Term bits are associated with a corresponding fuzzifier of the group selected by the Map bits.

TABLE 2
MAP SELECTION VALUES

| MAP VALUE | FUZZIFIERS |
|---|---|
| 0 | Fuzzifiers 0–7 |
| 1 | Fuzzifiers 4–11 |
| 2 | Fuzzifiers 8–15 |
| 3 | Fuzzifers 12–19 |
| 4 | Fuzzifers 16–23 |
| 5 | Fuzzifers 20–27 |
| 6 | Fuzzifers 24–31 |
| 7 | Keypad Use |

The bits 19–20 of the rule register 912 identify the output mode of the rule. According to the preferred embodiment, the pattern 00 corresponds to an Immediate output mode; the pattern 01 corresponds to an Accumulated Mode; the pattern 10 corresponds to a Max-of-Mins mode; and the pattern 11 corresponds to a Weighted Average mode. These output modes are described in further detail below.

The device configuration register 914 uses the lowest five bits to configure the fuzzy microcontroller 50. Bit 0 (P2CNT) controls the input port 2, such that when P2CNT= 0, the port 2 operates in the TDM data mode, and when P2CNT= 1, the port 2 operates in the keypad mode. Bit 1 (CHECK SUM) is a flag which records a check sum error. Bit 2 (BURST) is used to enable a Burst Mode in the I/O timing (see below). Finally, Bits 3 (WDEBL) and 4 (WDHLT) are used to control the watchdog timer function (see discussion below with respect to FIG. 13).

The timer control register 916 and the timer preload register 920 are discussed below with respect to FIG. 13. The output rule selection register is discussed below with respect to operation of the rule processor 90.

Figure 5:
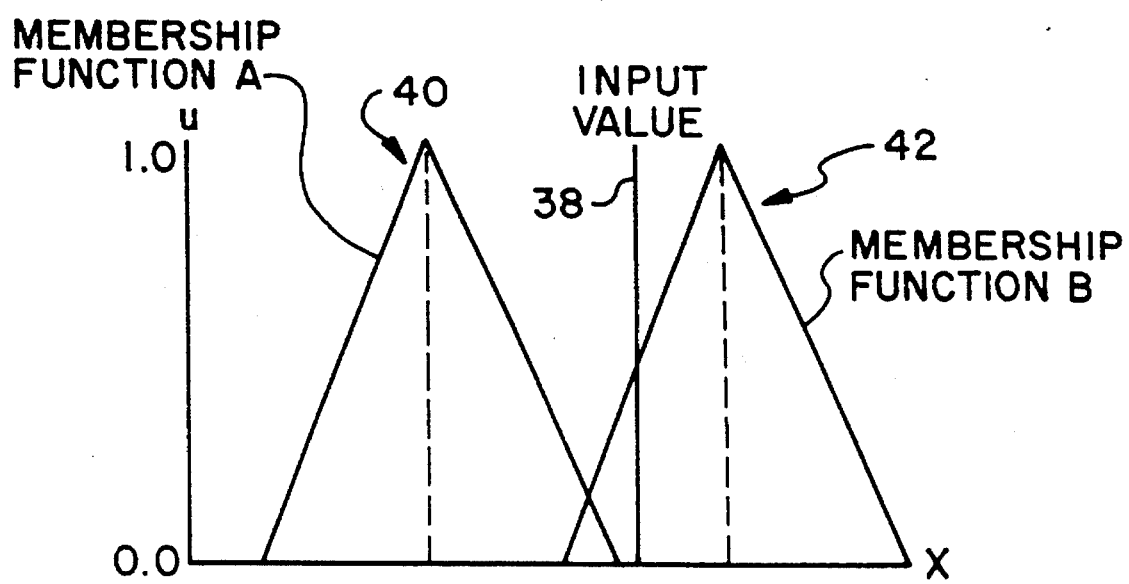
FIG. 5 illustrates a relationship between two fuzzy sets and a crisp input.

The fuzzifying method of the present invention will now be disclosed with reference to FIGS. 5 and 6A–6F. FIG. 5 illustrates a relationship between a crisp input 38 and two arbitrarily selected and exemplary fuzzy sets 40 and 42 having membership functions A and B. The term "crisp" refers to any input or output which yields a single, precise value. Since most sensors produce, and most actuators require, scalar values, the fuzzy microcontroller 50 of the present invention accepts crisp inputs and can provide crisp outputs.

Each membership function specifies a relationship between the crisp input 38 and the corresponding fuzzy set. In other words, the membership functions determine the size of the fuzzy sets 10 shown in FIG. 1C. The evaluation of the conjunction of the crisp input 38 with a membership function results in a "fuzzy term": the term represents the degree of membership or non-membership of the crisp input 38 in the corresponding fuzzy set. Since it is a fuzzy number, the term may be used in subsequent fuzzy rules, similar to Boolean operations.

Thus, the membership function in a fuzzy system defines the degree of similarity between an unknown input and a known value or class (for example, the fuzzy set). As shown in FIG. 6A, the degree of membership $\mu_a$ for a crisp input A having a value $X_a$ occurs at the point where the crisp input A intersects the membership function C. However, due to nonlinearities in the control system (for example, sensor characteristics, control responses, dynamic responses) the membership function $\mu$ may be nonlinear relative to the input dimension X, making the determination of the membership function shape, and hence the similarity determination, difficult to implement.

In order to avoid the determination of the membership function shape, the fuzzifying method of the present invention predefines the slope of the membership function, and determines the distance between the crisp input and the center of the membership function. As shown in FIG. 6B, the membership function D is defined to be linear with a predetermined slope (for example, the slope is one-to-one). Rather than determining the intersection point of the membership function and the crisp input $X_A$, the fuzzifying method measures the distance da by subtracting the crisp input from the known center value and ignoring the sign. The difference is then complemented with respect to the width of the membership function D so that if the input and the center are the same, then the similarity value da is a maximum, whereas if the input is further from the center, the similarity value approaches a minimum.

FIGS. 6C and 6D show a step membership function having true (inclusive) and inverse (exclusive) polarity, respectively. The dashed lines extending from the membership function illustrate the shape of the membership function if the width was set at a maximum. In other words, although the width of the membership functions in FIGS. 6C and 6D are set, at a value of "13" the maximum width according to the preferred embodiment is "63". Therefore, if a crisp input X was outside the membership function of FIG. 6C, the similarity value would be forced to the minimum or zero.

FIGS. 6E and 6F show membership functions for Greater Than and Less Than membership functions, respectively, each having inclusive polarity. In order for a crisp input to be a member of the Greater Than membership function, the distance between the crisp input and the center value must be greater than or equal to the lower boundary LB of the preset width value; conversely, in order for a crisp input to be a member of the Less Than membership function shown in FIG. 6F, the distance between the crisp input and the center value must be less than or equal to the upper boundary UB of the preset width value. It will be recognized using conventional Boolean operations as applied to fuzzy logic that a Greater Than membership function having inverse (exclusive) polarity will be equal to a Less Than membership function having a true (inclusive) polarity.

The advantages of the fuzzifying method of the present invention are that a designer of a control system is not required to determine a membership function shape for all fuzzy sets, and also that the fuzzifying method can be easily implemented in hardware. Further, the Less Than and Greater Than membership functions are asymmetrical membership functions. Consequently, utilization of both asymmetrical membership functions, via rule selection, provides the ability to define an adjustable height membership function. A preferred embodiment of the fuzzifying method is disclosed with reference to FIG. 8 (see below).

FIG. 7 shows in detail the fuzzifier input processor 100 of FIG. 3. The input processor 100 includes a clock select circuit 110, input registers 112 and 114, and a selector circuit 120. The clock select circuit 110 receives the multiplexer address signal (MA) from the timing generator 950 (see FIG. 3) and a master clock signal (MCLK) internal to the fuzzy microcontroller 50. The multiplexer address signal (MA) synchronizes the fuzzy microcontroller 50 with the TDM input signals D1 and D2. Specifically, the clock select circuit 110 outputs the master clock signal MCLK to the input registers 112 and 114 on one of eight different clock signal paths in accordance with the multiplexer address signal (MA). Thus, each of the clock signal path inputs to the input registers 112 and 114 receives one clock pulse during every I/O timeslot. An I/O timeslot is defined as the time needed to process the inputs based upon the number of fuzzifiers and rules processed (see discussion below regarding rule processor timing). The input registers 112 and 114 demultiplex the TDM input signals D1 and D2, respectively, by latching the input signals in accordance with the clock signals from the clock select circuit 110. The input registers 112 and 114 each output the demultiplexed data on a 64-bit bus as eight 8-bit inputs to the selector circuit 120.

According to the preferred embodiment, the selector circuit 120 is effectively a twenty eight-to-one demultiplexer which outputs the selected 8-bit digital input signal in accordance with the select signal (SEL) from the fuzzy processor 300 (see discussion below with respect to FIG. 8).

Thus, the fuzzy processor 300 selects any of the inputs to the selector circuit 120 as the data to be fuzzified.

FIG. 8 shows the fuzzy processor 300 of FIG. 3, also known as a similarity circuit or fuzzifier. The fuzzy processor 300 determines the similarity of a crisp input to a selected fuzzy set using the fuzzifying method disclosed with reference to FIGS. 6C–6F. The fuzzy processor 300 receives the selected input data from the input processor 100, the fuzzy set parameter data for the selected fuzzifier register (FR) from the control circuit 900, and the fuzzy register select signal (FR SEL) from the timing generator 950. The fuzzy processor 300 also receives the master clock signal (MCLK) and an active-low reset signal (RST).

As shown in FIG. 8, the fuzzy processor 300 receives the fuzzy register signal FR including the fuzzy set parameter data and latches the appropriate data. Specifically, the fuzzy processor includes an input select latch 310 which latches either the input select value identifying the crisp input to be fuzzified (bits 0–4 of the fuzzifier register 910) or the value identifying the floating center source (bits 8–12 of the fuzzifier register 910) in response to bit 22 (F/C) of the fuzzifier register 910. Thus, the input select signal (SEL) output by the input select latch 310 represents the floating center source if the F/C bit is cleared (F/C=0) and the crisp input source if the F/C bit is set (F/C=1).

The selected 8-bit input data from the input processor 100 is supplied to a center select circuit 320 and a subtractor 330. The center select circuit 320 also receives bits 8–15 of the fuzzifier register signal FR representing a fixed center value. The center select circuit 320 selects the appropriate center value in response to the F/C bit of the fuzzifier register signal FR and outputs the selected center to a latch 340. Thus, the bits 8–15 of the fuzzifier register signal FR are selected when the F/C bit is set and the selected input from the input processor 100 is selected as the floating center if the F/C bit is cleared.

The crisp input from the input processor 100 and the center value from the 8-bit latch 340 are passed to a subtractor 330 in accordance with the fuzzifying method described above, whereby the difference is calculated to determine the distance between the crisp input and the center value. The difference value from the subtractor 330 is input to a comparator 345 and compared with the membership function width value supplied by bits 16–21 of the fuzzifier register signal FR. The result of the comparison is output from the comparator 345 to a control logic circuit 350.

It will become readily apparent to a person of ordinary skill in the art that the fuzzification process according to the present invention requires only one clock cycle for fixed center processing but requires two clock cycles for the floating center processing: this is because the input processor 100 must supply the floating center value and then the selected input. Although not shown, the F/C input to the input select latch 310 is cleared after the first clock cycle in order to enable the selection of the input data to be fuzzified during the second clock cycle.

The control logic circuit 350 receives overflow bits from the subtractor 330 to determine whether the distance exceeds the maximum possible width of the membership function. According to the preferred embodiment, the maximum width is sixty-three (decimal); thus, bits 6–7 of the difference signal and the carry bit output from the subtractor 330 indicate whether the distance from the center to the crisp input exceeds the maximum width. The control logic circuit 350 also receives configuration signals from a demultiplexer 370, in accordance with the membership mode defined by bits 5–7 of the fuzzifier register signal FR, and a polarity bit which determines whether the crisp input will be fuzzified with respect to the true (inclusive) membership function or its inverse (exclusive), as shown for example in FIGS. 6C and 6D, respectively.

The control logic circuit 350 outputs control signals to an alpha cut calculator 360 in response to the result of the comparison from the comparator 345, the polarity bit and the configuration signals identifying the membership mode. The alpha cut calculator 360 outputs the fuzzified data from the difference of the subtractor 330 using the following logic: if the crisp data is outside the membership function (e.g., the result of comparison indicates the difference value is greater than the width of the membership function), then the fuzzified value is forced to zero if the polarity bit is not set (e.g., membership function is inclusive or "TRUE"); however, if the polarity bit is set, then the fuzzified value is forced to zero if the crisp data is "inside" the membership function.

In accordance with the fuzzifying method of the present invention, since the membership function has a one-to-one linear slope, the alpha cut calculator 360 takes the complement of the difference value and outputs the result as a similarity value, representing the degree of membership to the fuzzy set. The complement is determined as follows. According to the exemplary membership function presented in FIG. 6C, the maximum width of the membership function is "63" decimal, so that if a crisp input had, for example, a value "CI=7" and a selected membership function had a center location "CL=13" decimal and a width "W=9" then the difference "DIFF=13−7=6" would be complemented to result in a similarity value "COMP(DIFF)=ABS(6−63)=57" decimal. Thus, the similarity value is "57" with the maximum value being "63" if the difference DIFF was zero. As a result, the fuzzifying method of the present invention provides a simple and effective method for similarity determination between a crisp input and a fuzzy set.

The alpha cut calculator 360 includes an invertor circuit 362, an AND circuit 364, and an OR circuit 366, each of which receive the control signals from the control logic circuit 350. The invertor circuit 362 performs a 1's complement inversion of the lowest six bits of the difference signal (DIFF) output from the subtractor 330 in accordance with the I/E bit from the fuzzifier register signal FR. The AND circuit 364 clears all the bits of the difference value when a "0" is received from the control logic circuit 350, and the OR circuit 366 sets all the bits of the difference value when a "1" is received from the control logic circuit 350.

The similarity value is output from the alpha cut calculator 360 to a select circuit 380. The similarity value, when referenced with its corresponding fuzzy set, is known as a fuzzy number. The select circuit 380 also receives the selected input data from the input processor 100. As a result, if the bits 5–6 of the fuzzifier register signal FR indicate the Pass mode is selected, the selected input data is output by the select circuit 380, thereby bypassing the fuzzifying step. The Pass mode is particularly effective when the input data has already been preprocessed as a fuzzy number, for example when a plurality of fuzzy microcontrollers are interconnected (see FIG. 17 below).

The select circuit 380 outputs the fuzzified data to a fuzzy data register 390, which latches the data in one of thirty-two (32) registers in accordance with the 5-bit fuzzy register select signal (FR SEL) and the master clock signal (MCLK).

The fuzzifying method is repeated for all the fuzzy sets. According to the preferred embodiment, a maximum of thirty-two fuzzy sets are available with their parameters being stored in the input fuzzifier registers 200. However, modifications may be made to increase or decrease the number of fuzzy sets to be used.

The timing for the fuzzifier section 80 will now be described. Although not shown in FIG. 3, the control circuit 900 includes two timing controllers: a fuzzifier timing controller; and a rule processor timing controller. The timing generator 950 also serves as an I/O timing controller. The fuzzifier timing controller operates in a cyclic manner, based upon the number of fuzzifiers being used. The fuzzifier timing controller starts its cycle with the first fuzzifier register "0" and sequences to the next fuzzifier register at each clock cycle for a fuzzifier register having a fixed center; if the fuzzifier has a floating center, then two clock cycles are required. The last fuzzifier register is identified by bits 5–7 being equal to "7" indicating an "END" membership mode. Thus, when the fuzzifier timing controller detects an "END" flag, the fuzzifier timing controller resets and begins addressing fuzzifier register 0. Therefore, since the cycle of the fuzzifier timing controller depends on the number of fuzzifier registers accessed before the "END" membership mode is detected, the fuzzifier cycle could be as short as two clock cycles if only fuzzifier register 0 is used, or as long as sixty-four clock cycles if all thirty-two fuzzifier registers were used in the floating fuzzifier mode.

The control circuit 900 outputs to the timing generator a FZCOUNT signal and bit 22 (FC) of each fuzzifier register being processed. The FZCOUNT signal equals the maximum number of clock cycles required for fuzzifier processing. The FC signal indicates whether the fuzzy register being processed has a fixed or floating center. Thus, the timing generator outputs the FR SEL signal and initially identifies fuzzifier register "0", and is incremented, in accordance the FC signal, every clock cycle or every two clock cycles until the number of elapsed clock cycles equals the value of the FZCOUNT signal. The timing generator 950 thereafter resets the FR SEL signal.

After all the fuzzy numbers for their associated fuzzy sets are loaded into the fuzzy data register 390, the fuzzy data register 390 simultaneously outputs the thirty-two 6-bit values on a 192-bit RESULTS bus. The fuzzy microcontroller 50 then processes the fuzzified input signals in the Rule processor 90 to determine whether a selected rule provides the optimum output given the fuzzy inputs. The processing is a two-step process: first, after the term selector 400 selects the appropriate data (see below), the minimum comparator 500 determines a minimum rule term of a selected rule; then, the maximum comparator 600 determines which of the rules corresponding to the desired output have the maximum value as a minimum rule term. The rule which has the maximum value for the minimum rule term is deemed the optimal output given the inputs.

As shown in FIG. 3, the minimum comparator 500 receives those fuzzy inputs from the term selector 400 which are specified by the rule terms to be processed. In other words, the term selector 400 receives the Map bits 16–18 of the rule register 912 being processed via the rule register signal path RR. Thus, the term selector outputs the values for one of the groups of eight fuzzifiers shown in Table 2 above for processing in the minimum comparator 500. The selected fuzzy inputs are processed by a multipath feedforward network specially dedicated for fast and efficient processing in order to find a minimum rule term for a rule. If a maximum rule term is desired, then the inputs would be inverted before processing.

Figure 9A:
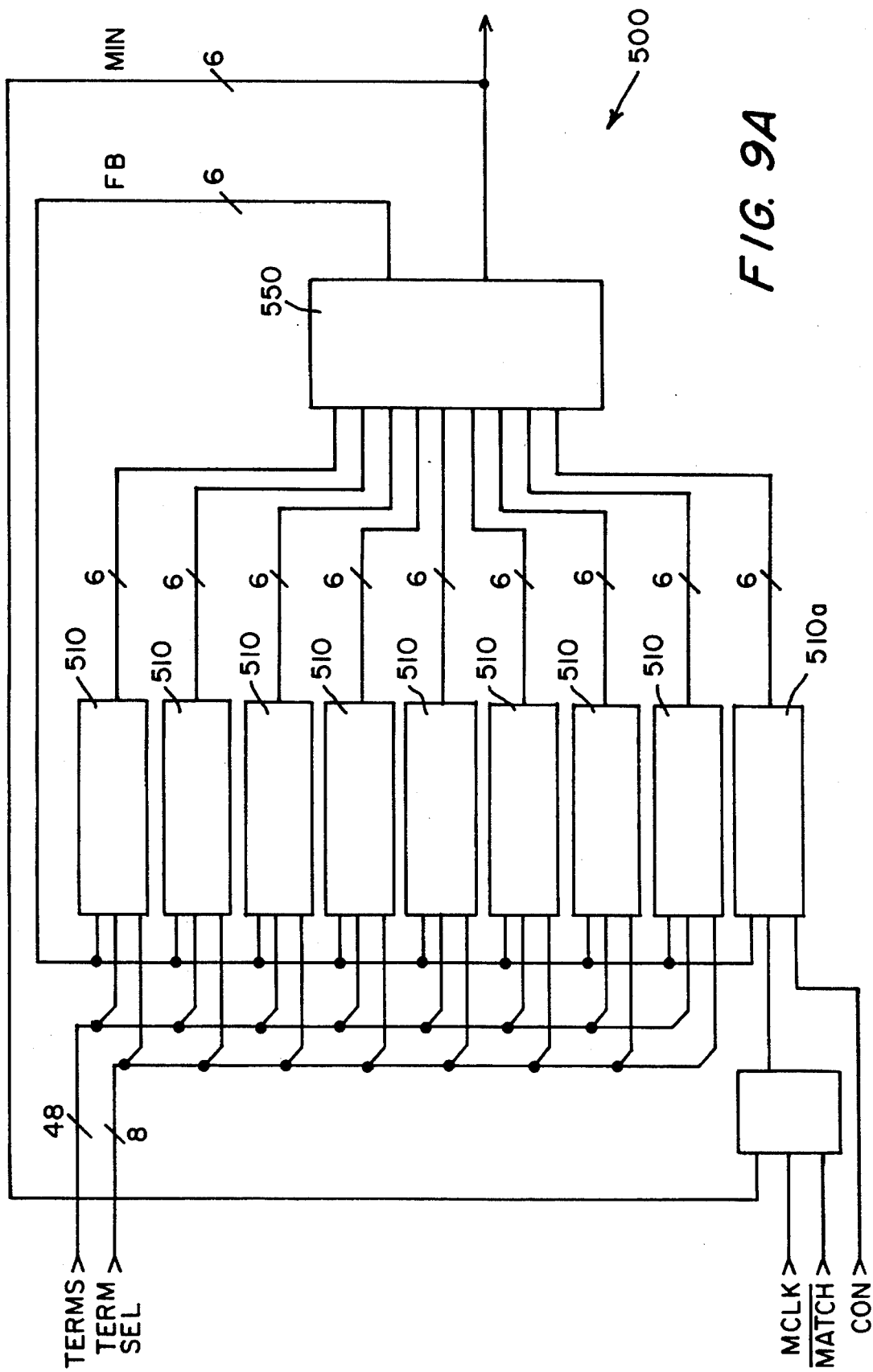

FIG. 9A shows a block diagram of the minimum comparator 500 shown in FIG. 3. The minimum comparator 500 is a multipath feedforward network specially designed to determine a minimum value among the eight 6-bit values asynchronously. As a result, the minimum comparator 500 determines the minimum input value within one system clock cycle. The logic of the minimum comparator 500 is such that when, for example, two digital words are compared to determine which has the minimum value, the emphasis is placed on the higher order bits. As a result, if there exists a difference in a higher-order bit between the two words, the lower-bits can be disregarded. Therefore, the minimum comparator 500 first compares the higher-order bits of the values being compared, and inhibits all the lower bits when a mismatch is found.

Figure 9B:
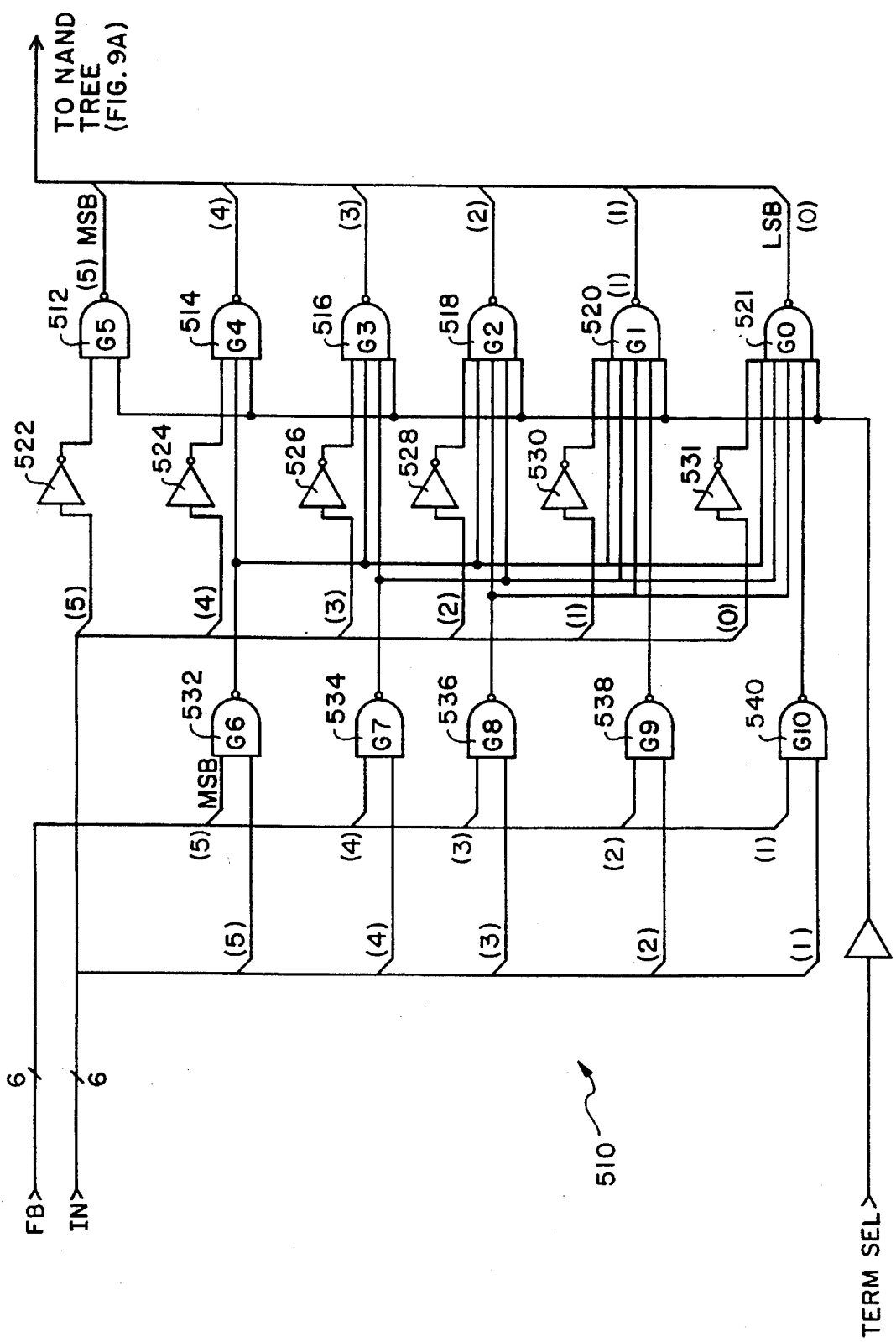

The functions of the minimum comparator 500 will become more apparent with the following description of the minimum comparator 500 with reference to FIGS. 9A, 9B and 9C.

As shown in FIG. 9A, the minimum comparator 500 receives the eight 6-bit (a total of forty-eight bits) fuzzified inputs from the term selector 400 and inputs each fuzzified input (IN) to a corresponding minimizing element 510, which also receives a feedback input (FB) from a NAND tree 550. The NAND tree 550 determines whether, for a given significant bit, any of the outputs from the minimizing element 510 have a different value for the corresponding significant bit. If there are any outputs which do not have the same value for the corresponding significant bit, the minimizing element 510 outputs a bit suppression signal as the feedback input (FB) to suppress the analysis of lower order bits in the minimizing element 510.

Each minimizing element 510 receives the 6-bit fuzzified input (IN), the 6-bit feedback input (FB) and term select input (TERM SEL) input. The term select input is supplied from bits 8–15 of the rule register signal RR as stored in the rule registers 912 in accordance with the rule being processed.

The minimum comparator 500 also includes an additional minimizing element 510a and a latch 552 for determining a minimum amongst different groups of fuzzified inputs. Specifically, the minimum value (MIN) output from the NAND tree 550 is latched by the latch 552 and supplied to the additional minimizing element 510a, which is enabled by the CON bit (bit 21 of the rule register 912) supplied by the rule registers signal RR from the control circuit 900 (see FIG. 3). Thus, the minimum rule term for the processed rule can be concatenated with a subsequent minimizing cycle by enabling the additional minimizing element 510a.

FIG. 9B discloses a minimizing element 510 from FIG. 9A. As shown in FIG. 9B, the term select signal (TERM SEL).is input to a NAND gate G5 512, NAND gate G4 514, NAND gate G3 516, NAND gate G2 518 and NAND gate G1 520 and NAND gate G0 521. The fuzzy signal IN is input to inverters 522, 524, 526, 528, 530 and 531, whereby the inverter 522 receives the most significant bit (MSB) (also referred to as "Bit 5") and the inverter 531 receives the least significant bit (LSB) (also referred to as "Bit 0") of the fuzzy signal IN. Bits 5, 4, 3, 2 and 1 of the fuzzy signal IN are also input to the NAND gate G6 532, NAND gate G7 534, NAND gate G8 536, NAND gate G9 538, and NAND gate G10 540, respectively. The NAND gate G6 532, NAND gate G7 534, NAND gate G8 536, NAND gate G9 538 and NAND gate G10 540 also receive the five most significant bits of the feedback signal FB, respectively, whereby the NAND gate G6 532 receives the MSB. The outputs of the inverter 522, inverter 524, inverter 526, inverter 528, inverter 530 and inverter 531 are supplied to the NAND gate G5 512, NAND gate G4 514, NAND gate G3 516, NAND gate G2 518 and NAND gate G1 520 and NAND gate G0 521, respectively. In addition, the output of the NAND gate G6 532 is supplied to the NAND gate G4 514, NAND gate G3 516, NAND gate G2 518, NAND gate G1 520 and NAND gate G0 521; the output of the NAND gate G7 534 is supplied to the NAND gate G3 516, NAND gate G2 518, the NAND gate G1 520 and NAND gate G0 521; the output of the NAND gate G8 536 is supplied to the NAND gate G2 518, NAND gate G1 520 and NAND gate G0 521; the output of the NAND gate G9 538 is supplied to the NAND gate G1 520 and NAND gate G0 521; and the output of the NAND gate G10 540 is supplied to the NAND gate G0 521. The outputs of the NAND gate G5 512, NAND gate G4 514, NAND gate G3 516, NAND gate G2 518, NAND gate G1 520 and NAND gate G0 521 are combined;and supplied to the NAND tree 550.

FIG. 9C shows in further detail the NAND tree 550 disclosed in FIG. 9A. As shown in FIG. 9C, the NAND tree 550 comprises a NAND gate I5 552, a NAND gate I4 554, a NAND gate I3 556, a NAND gate I2 558, a NAND gate I1 560 and NAND gate I0 562. The NAND gate I5 552 receives all the MSBs (also referred to as "Bit 5") from all the sixteen minimum elements 510 shown in FIG. 9A. The NAND gate I4 554 similarly receives Bit 4 from all the sixteen minimum elements 510; the NAND gate I3 556 receives Bit 3; the NAND gate I2 558 receives Bit 2; the NAND gate I1 560 receives Bit 1; and the NAND gate I0 562 receives the LSBs Bit 0. The outputs of the NAND gates 552, 554, 556, 558, 560 and 562 are combined and output as the feedback signal FB. The outputs of the NAND gates also pass through corresponding inverters 580 in order to obtain a minimum signal MIN. The NAND gate I5 552 outputs the MSB and the NAND gate I0 562 outputs the LSB of the feedback signal FB and the minimum signal MIN.

The operation of the minimum comparator 500 will now be described with reference to FIGS. 9A, 9B and 9C. Each gate should have a uniform propagation delay; thus, the following time references (tn) refer to the increments in time caused by gate propagation delays. The MSB of the input IN will be referred to as Bit 5, the LSB will be referred to as Bit 0, and the intermediate bits will be referred to herein as Bits 4, 3, 2, and 1 respectively.

Assume that two of the minimum elements 510 receive inputs A and B, respectively, referred to as minimum element A and minimum element B. The input A has a fuzzy value of 18 decimal (100010 binary) and the input B has a fuzzy value of 19 decimal (100011 binary). The inputs A and B are simultaneously applied to the two minimum elements A and B at time t0, and all other minimum elements 510 are disabled by their respective term select (TERM SEL) signal. Bit 5 of both inputs A and B is a logic "1" so that the output of the inverter 522 in both minimum elements A and B will be "0" at time t1. As a result, the corresponding NAND gates (G5) 512 will output a "1" at time t2. These two outputs are applied to the NAND gate I5 552 shown on FIG. 9C, which outputs a "0" at time t3 as the MSB of the FB signal, as shown in TABLE 3.

TABLE 3

| Time (Delay Intervals) | OUTPUTS | | |
|---|---|---|---|
| | Minimum Element A | Minimum Element B | NAND Tree |
| $t_1$ | Inverter 522 = 0 | Inverter 522 = 0 | X |
| $t_2$ | G5 = 1 | G5 = 1 | X |
| $t_3$ | | | I5 = 0 |
| $t_4$ | G6 = 1 | G6 = 1 | |
| $t_5$ | G4 = 0 | G4 = 0 | |
| $t_6$ | | | I4 = 1 |
| $t_7$ | G7 = 1 | G7 = 1 | |
| $t_8$ | G3 = 0 | G3 = 0 | |
| $t_9$ | | | I3 = 1 |
| $t_{10}$ | G8 = 1 | G8 = 1 | |
| $t_{11}$ | G2 = 0 | G2 = 0 | |
| $t_{12}$ | | | I2 = 1 |
| $t_{13}$ | G9 = 1 | G9 = 1 | |
| $t_{14}$ | G1 = 1 | G1 = 1 | |
| $t_{15}$ | | | I1 = 0 |
| $t_{16}$ | G10 = 1 | G10 = 1 | |
| $t_{17}$ | G0 = 0 | G0 = 1 | |
| $t_{18}$ | | | I0 = 1 |

The Bit 5 of the FB signal and Bit 5 (logic 1 for inputs A and B) of the IN signal are applied to the NAND gates (G6) 532 for both minimum elements A and B, causing the NAND gates (G6) 532 to output a "1" at time t4. The output of NAND gates (G6) 532 enables the NAND gates (G4) 514 for both minimum elements A and B, each of which output Bit 4 (logic 0 for inputs A and B) of the corresponding input signal IN at time t5. The outputs of the NAND gates (G4) 514 are input to the NAND gate I4 554 in FIG. 9C, which outputs a "1" at time t6 as Bit 4 of the FB signal, as shown in TABLE 3.

As shown in FIG. 9B, the Bit 4 of the FB signal and Bit 4 of the IN signal are applied to the NAND gates (G7) 534 for both minimum elements A and B, causing the NAND gates (G7) to output a "1" at time t7, thereby enabling the NAND gates (G3) 516 for both minimum elements A and B. The NAND gates (G3) 516 both output Bit 3 (logic 0 for inputs A and B) at time t8. The outputs of the NAND gates (G3) are input to the NAND gate I3 556 in FIG. 9C, which outputs a "1" at time t9 as Bit 3 of the FB signal, as shown in TABLE 3.

As shown in FIG. 9B, the Bit 3 of the FB signal and Bit 3 of the IN signal are applied to the NAND gates (G8) 536 for both minimum elements A and B, causing the NAND gates (G8) to output a "1" at time t10, thereby enabling the NAND gates (G2) 518 for both minimum elements A and B. The NAND gates (G2) 518 both output Bit 2 (logic 0 for inputs A and B) at time t11. The outputs of the NAND gates (G2) are input to the NAND gate I2 558 in FIG. 9C, which outputs a "1" at time t12 as Bit 2 of the FB signal, as shown in TABLE 3.

As shown in FIG. 9B, the Bit 2 of the FB signal and Bit 2 of the IN signal are applied to the NAND gates (G9) 538 for both minimum elements A and B, causing the NAND gates (G9) to output a "1" at time t13, thereby enabling the NAND gates (G1) 520 for both minimum elements A and B. The NAND gates (G1) 520 both output Bit 1 (logic 1 for inputs A and B) at time t14. The outputs of the NAND gates (G1) are input to the NAND gate I1 560 in FIG. 9C, which outputs a "0" at time t15 as Bit 1 of the FB signal, as shown in TABLE 3.

As shown in FIG. 9B, the Bit 1 of the FB signal and Bit 1 of the IN signal are applied to the NAND gates (G10) 540 for both minimum elements A and B, causing the NAND gates (G10) to output a "1" at time t16, thereby enabling the NAND gates (G0) 521 for both minimum elements A and B. The NAND gates (G0) 521 both output Bit 0 (logic 0 for input A; logic 1 for input B) at time t14. The outputs of the NAND gates (G0) are input to the NAND gate I0 562 in FIG. 9C, which outputs a "1" at time t18 as Bit 0 of the FB signal, as shown in TABLE 3.

Thus, at time t18 the asynchronous operation of the minimum elements A and B, as well as the NAND tree 550, is complete, and the minimum comparator 500 is deemed to have "stabilized". The output FB from the NAND tree 550 includes the inverse (1's complement) of the minimum value, namely FB=011101. The inverters 580 invert (1's complement) the FB signal and output the minimum signal MIN, whereby MIN=100010.

As a result, the minimum comparator 500 determined the minimum between input A (100010) and input B (100011) to be MIN=100010. The maximum time interval to determine the minimum will be when the difference between the inputs is found solely in the least significant Bit 0. However, since the inputs are processed in parallel, the time interval for determining the minimum is not affected if more than two inputs are processed. Rather, since the time interval to determine the minimum is dependent on the propagation delay, the use of semiconductor devices having small propagation delays enable a minimum determination, even with all nine inputs, within 40 nanoseconds. Thus, the minimum value can be quickly determined, regardless of the number of inputs.

The minimum determination time interval is even smaller if higher significant bits are different, since the lower order bits are automatically suppressed. The following example illustrates how the time interval for determining the minimum value is reduced.

Assume that two of the minimum elements 510 receive inputs C and D, respectively, referred to as minimum element C and minimum element D. The input C has a fuzzy value of 110100 binary and the input D has a fuzzy value of 100000 binary. The response of the minimum comparator 500 is identical to the response with inputs A and B, as described above, up to time t5, where the NAND gates (G4) 514 are enabled and Bit 4 for the respective signals IN (logic 1 for C; logic 0 for D) are output to the NAND gate I4 554 in FIG. 9C. Since the Bit 4 for signals C and D are different, the NAND gate I4 554 outputs a "1" at time t6 as Bit 4 of the FB signal.

At time t6, Bit 4 of the FB signal and Bit 4 of the IN signal are applied to the NAND gates (G7) 534 for both minimum elements C and D. Note that Bit 4 of the FB signal is a "1" whereas Bit 4 of the input signal C (IN) is a "1" also; as a result, the NAND gate (G7) 534 for minimum element C outputs a "0" at time t7, which disables the NAND gates (G3, G2, G1 and G0) 516, 518, 520 and 521 by forcing their output to a "1" at time t8.

At the same time t6, Bits 1, 2, 3 and 4 of the input signal D (IN) are all "0"; as a result, all the NAND gates (G7, G8, G9 and G10) 534, 536, 538 and 540 are forced to output a "1" at time t7. As a result, since the NAND gates (G3, G2, G1 and G0) 516, 518, 520 and 521 of the minimum element D each are input a "1" from the inverted IN signal and a "1" from the corresponding NAND gate, the NAND gates (G3, G2, G1 and G0) 516, 518, 520 and 521 of the minimum element D each output a "0" at time t8.

Thus, at time t8, as shown in FIG. 9C, the NAND gate I3 556, the NAND gate I2 558, the NAND gate I1 560 and the NAND gate I0 562 receive the respective inputs from the NAND gates of minimum elements C and D shown in FIG. 9B. The outputs from the NAND gates of minimum element C are "1" and the outputs from the NAND gates of minimum element D are "0", so that the NAND gate I3 556, the NAND gate I2 558, the NAND gate I1 560 and the NAND gate I0 562 each output a "1" as the respective bits of the FB signal at time t9. As a result, the FB signal is FB=011111. As shown in FIG. 9A, when the FB signal passes through the inverters 580, the minimum signal MIN is MIN=100000, which is the value of input D. Table 4 summarizes the process of finding the minimum between inputs C and D.

TABLE 4

| Time (Delay Intervals) | OUTPUTS | | |
|---|---|---|---|
| | Minimum Element C | Minimum Element D | NAND Tree |
| $t_1$ | Inverter 522 = 0 | Inverter 522 = 0 | X |
| $t_2$ | G5 = 1 | G5 = 1 | X |
| $t_3$ | | | I5 = 0 |
| $t_4$ | G6 = 1 | G6 = 1 | |
| $t_5$ | G4 = 1 | G4 = 0 | |
| $t_6$ | | | I4 = 1 |
| $t_7$ | G7 = 0 | G7 = 1 | |
| $t_8$ | G3 = 1 | G3 = 0 | |
| | G2 = 1 | G2 = 0 | |
| | G1 = 1 | G1 = 0 | |
| | G0 = 1 | G0 = 0 | |
| $t_9$ | | | I3 = 1 |
| | | | I2 = 1 |
| | | | I1 = 1 |
| | | | I0 = 1 |

As a result, the minimum between inputs C and D was found at time t9, which represents the time duration of nine propagation delays within the minimizing element 510 and the NAND tree 550. As a result, the stabilization time of the minimum comparator 500 will be a maximum of time t18, and may be reduced depending on the different input conditions.

It should be realized that the minimum comparator 500 according to the present invention may also be implemented in the form of a neural network having feedback capabilities. Specifically, a three-layer neural network may be implemented, wherein the first layer includes the functions of the NAND gate G5 512, NAND gate G4 514, NAND gate G3 516, NAND gate G2 518, NAND gate G1 520 NAND gate G0 521 and the corresponding inverters 522, 524, 526, 528, 530 and 531. The second neural layer would include the functions of the NAND tree 550 as shown in FIG. 9C, and the third neural layer would include the functions of the NAND gate G6 532, NAND gate G7 534, NAND gate G8 536, NAND gate G9 538 and NAND gate G10 540. According to this variation, it will be recognized that the output signal FB will actually be output from the middle layer as described above, and that the third layer would feed back to the first layer to enable or inhibit inputs.

The multipath feedforward network of the minimum comparator 500 has been designed with the objectives of providing the fastest determination of a minimum/maximum using the least complex circuitry to minimize cost.

Since the multipath feedforward network according to the present invention is specially dedicated to determine a minimum, or maximum, rule term for each rule to be processed, the multipath feedforward network can process a plurality of selected fuzzified inputs for a given rule in parallel. In addition, the multipath feedforward network operates asynchronously, without the necessity of an external clock. Therefore, since a rule can be processed during each cycle of the network, the present invention enables extremely rapid rule processing on the order of thirty million rules per second. In addition, the dedicated network can be designed using simple logic elements for minimum use of silicon on a semiconductor chip, resulting in a lower cost for the semiconductor chip.

Figure 10:
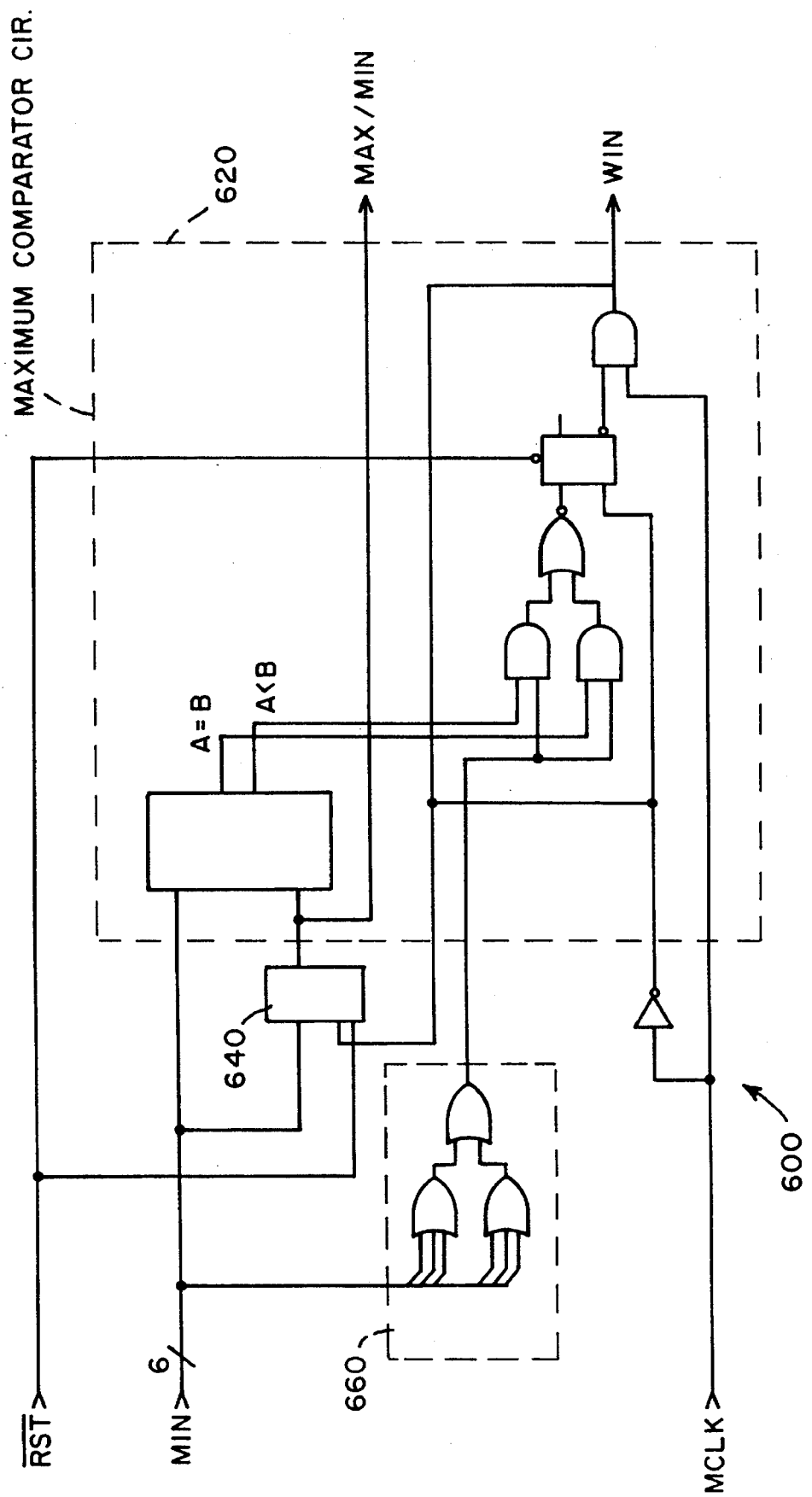
FIG. 10 discloses the maximum comparator of FIG. 3.

FIG. 10 discloses the maximum comparator 600 of FIG. 3. The MIN signal is output from the minimum comparator 500 as the minimum rule term for a given processed rule. The processed rule is identified by the rule register signal RR, which is input from the control circuit 900. The MIN signal is input to a maximum comparator circuit 620, which compares the MIN RULE TERM signal with a previously stored Max-of-Min signal from a delay flip-flop 640. If the MIN RULE TERM is greater than the Max-of-Min signal, the maximum comparator circuit 620 outputs a strobe signal (Stb). When the strobe signal is received, the delay flip-flop 640 is updated with the MIN RULE TERM which becomes the new Max-of-Min.

The maximum comparator 600 also includes a zero-reject circuit 660 which outputs a signal only when the value of the minimum term MIN does not equal zero. Consequently, the value MIN=0 is disqualified from being a minimum rule term. As a result, the zero-reject circuit 660 prevents the maximum comparator 600 from falling into a local minimum.

As shown in FIG. 3, the rule mode processor 710 receives the WIN signal and the MAX/MIN signal from the maximum comparator 600, the MIN signal from the minimum comparator 500, and an 8-bit feedback signal from the output register 750. Although not shown, the rule mode processor 710 also receives bits 0–7 and 19–20 of the rule register signal RR representing the action value (ACTION) and output mode (OUT MODE) for a rule being processed, respectively. The output mode of the rule register signal RR determines whether the rule mode processor 710 outputs the result in an Immediate mode, Accumulate mode, Max-of-Min mode or Weighted Average mode. In the Immediate mode, the action value for the rule being processed (bits 0–7 of the rule register signal RR) is latched and output by the rule mode processor 710 in response to the WIN signal from the maximum comparator 600. In the accumulate mode, the action value for the rule being processed is latched, added to the feedback signal from the output register 750, and output by the rule mode processor 710 in response to the WIN signal.

Figure 17:
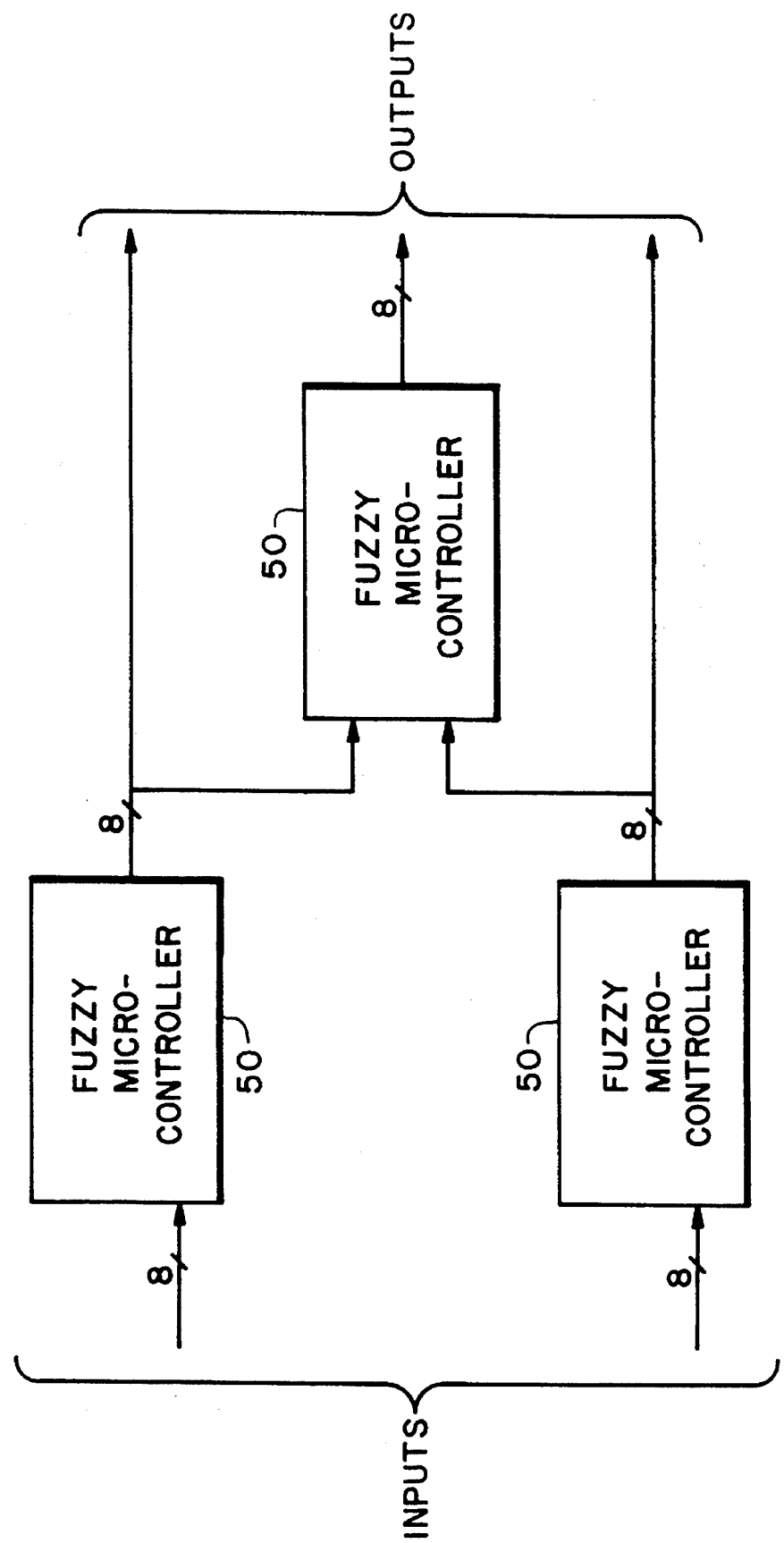
FIG. 17 illustrates a plurality of the fuzzy microcontrollers cascaded for greater processing capacity.

The Max-of-Mins mode causes the rule mode processor 710 to latch and output the value of the MAX/MIN signal to the output register 750 in response to the WIN signal. The Max-of-Mins mode, used in conjunction with the Pass Mode of the fuzzy processor 300, enables device expansion as shown in FIG. 17.

The Weighted Average mode causes the rule mode processor 710 to provide an averaged value of all the actions associated with the winning rules from the maximum comparator to be applied to the output register 750. Thus, the weighted average mode modifies the output register 750 by the average of the actions of all rules where a membership was considered valid. Specifically, the weighted average mode follows the equation:

$$W = \frac{\sum_{i=1}^{n} m_i * a_i}{63 * \sum_{i=1, m_i \neq 0}^{n} 1}$$

where W is the average action value output by the rule mode processor 710, n is the number of rules used by an output, $m_i$ is the minimum of terms value (MIN) for rule i, and $a_i$ is the action value (ACTION) assigned to the rule i. The rule mode processor 710 multiplies the minimum of terms value MIN with the corresponding action value ACTION and accumulates the weighted average W until the last rule for a corresponding output is processed. Normalization is performed by dividing the accumulated value by the number of rules n multiplied by the value "63", which is the height of the membership function.

Alternatively, the normalization can be performed by dividing the accumulated value by "64" by performing a bit shift of the numerator. One will recognize that the resulting error will be negligible.

The number of rules n used by an output and the identity of a last rule for each output is determined by a output rule selection register located in the control circuit 900, which stores the address for the last rule for each output. After the rule mode processor 710 receives a Last Rule signal (not shown) from the control circuit 900 indicating the last rule for a given output has been processed, the rule mode processor outputs the weighted average value W to the output register 750.

The selected output of the rule mode processor 710 is supplied to the output register 750. The output register 750 latches the data and outputs the 8-bit data for each of the eight outputs in accordance with the OUTSEL signal from the timing generator 950. The output register also outputs the latched data as feedback data to the rule mode processor 710 in accordance with the OUTSEL signal. The output register outputs the 8-bit data for each of the eight outputs on a 64-bit bus to the output processor 800.

The timing for the rule processing will now be described. The control circuit 900 and the timing generator 950 control the rule processor 90 to operate in a cyclic manner. The rule processor timing controller of the control circuit 900 processes a rule at every clock cycle until the last rule used has been processed, indicated by the END bit being set in the Output Rule Selection register in the control circuit 900. When the last rule has been processed, fuzzy microcontroller 50 resets and starts again at rule register "0". Thus, if only one rule is used then only one clock is required, whereas 128 clocks are needed if all 128 rules are used.

Timing requirements for the rule processor 50 are determined by monitoring the configuration of the control data in the control circuit 900. Specifically, the lower 7 bits of the address location of the output rule selection register storing the END flag are output on the RCOUNT signal path from the control circuit 900 to the timing generator 950. The value RCOUNT directly correlates to the number of clocks required for rule processing for all the outputs.

Rule processing begins by applying rule 0 to the first corresponding register of the output register 750, which is selected by the OUTSEL signal from the timing generator 950. The OUTSEL signal from the timing generator 950 is set at value "0" at the beginning of the rule processing cycle, and is incremented in response to a DONE signal from the rule processor timing controller of the control circuit 900. The DONE signal indicates that all rules for a given output have been processed, and is output by the control circuit 900 when the address of the rule being processed equals the value of the corresponding output rule selection register. The incrementing of the OUTSEL signal causes the rule processor 90 to continue processing for the next output until another DONE signal is received. When the number of rules processed equals the value of the RCOUNT signal, the timing generator resets the OUTSEL signal to "0" to restart the processing cycle for the output "0".

The timing generator 950 acts as an I/O timing generator by generating the multiplexer address signals (MA) during an I/O timeslot in accordance with the timing of the rule processor 90 and the fuzzy processor 300. Specifically, the period for one I/O timeslot is equal to the maximum number clock cycles occurring for the number of rules or fuzzifiers, whichever is greater, divided by 8 output intervals; the value is thereafter rounded up to the next integer value to ensure modulo-8 timing. For example, if the fuzzy microcontroller 50 was configured for sixty-two (62) rules and thirty (34) clocks associated with the fuzzifiers such that RCOUNT=62 and FZCOUNT=34, the timing generator 950 would determine the I/O timeslot by dividing the RCOUNT value (62) by the modulo-8 to obtain a non-integer value (7.75), which is rounded up to an integer of eight (8) clocks per I/O timeslot. Similarly, if RCOUNT=16 and FZCOUNT=37, then the timing generator 950 would divide FZCOUNT by modulo 8, and round upon the non-integer value (4.625) to an integer of five (5) clocks per I/O timeslot.

Therefore, the timing generator 950 outputs the multiplexer address signal MA during each I/O timeslot as determined by the signals RCOUNT and FZCOUNT from the control circuit 900.

The fuzzy microcontroller 50 is able to perform batch mode, or "single step" I/O processing. In this mode, defined by bit 2 of the device configuration register, the control circuit 900 and the timing generator 950 will operate a singe I/O processing cycle and service each input and output timeslot one time, beginning when the DI input to the control circuit 900 is asserted to logic "1". If the D1 input pin remains asserted at logic "1", the control circuit 900 will continue processing inputs, fuzzifiers, rules and outputs until the input DI becomes a logic "0". Once the input DI becomes a logic "0" the fuzzy microcontroller 50 pauses at the end of the current cycle and awaits the assertion of the DI input prior to continuing the next cycle. Thus, the fuzzy microcontroller provides single step I/O batch processing.

FIG. 11 discloses a block diagram of the output register 800 of FIG. 3. The output from the rule processor 90 is supplied to a plurality of registers 820 which latch the data in response to the master clock MCLK. The outputs of the registers 820 are time-division multiplexed by a time division multiplexer 880 in accordance with the multiplexer address signal (MA). The resulting 8-bit TDM signal is output, for example, to eight output devices having the capability to demultiplex the TDM signal. The outputs of the registers 820 are also fed back to the fuzzifier input selector 100 as the Loop Back Input signal as shown in FIG. 3.

Although the outputs of the multiplexer 880 are digital, the TDM output can be modified by adding a D/A converter to the output processor 800 in order to provide an analog TDM output signal.

Figure 12B:
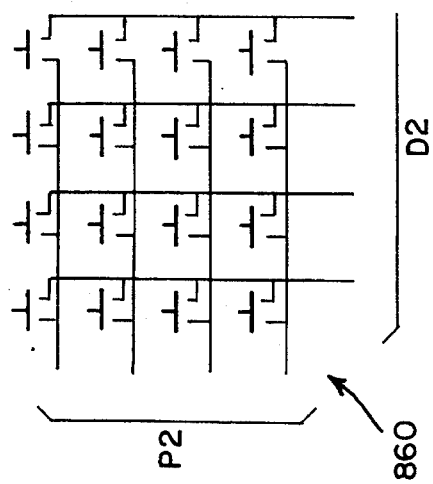
FIG. 12 discloses a schematic diagram of the keyboard controller of FIG. 3.
Figure 12A:
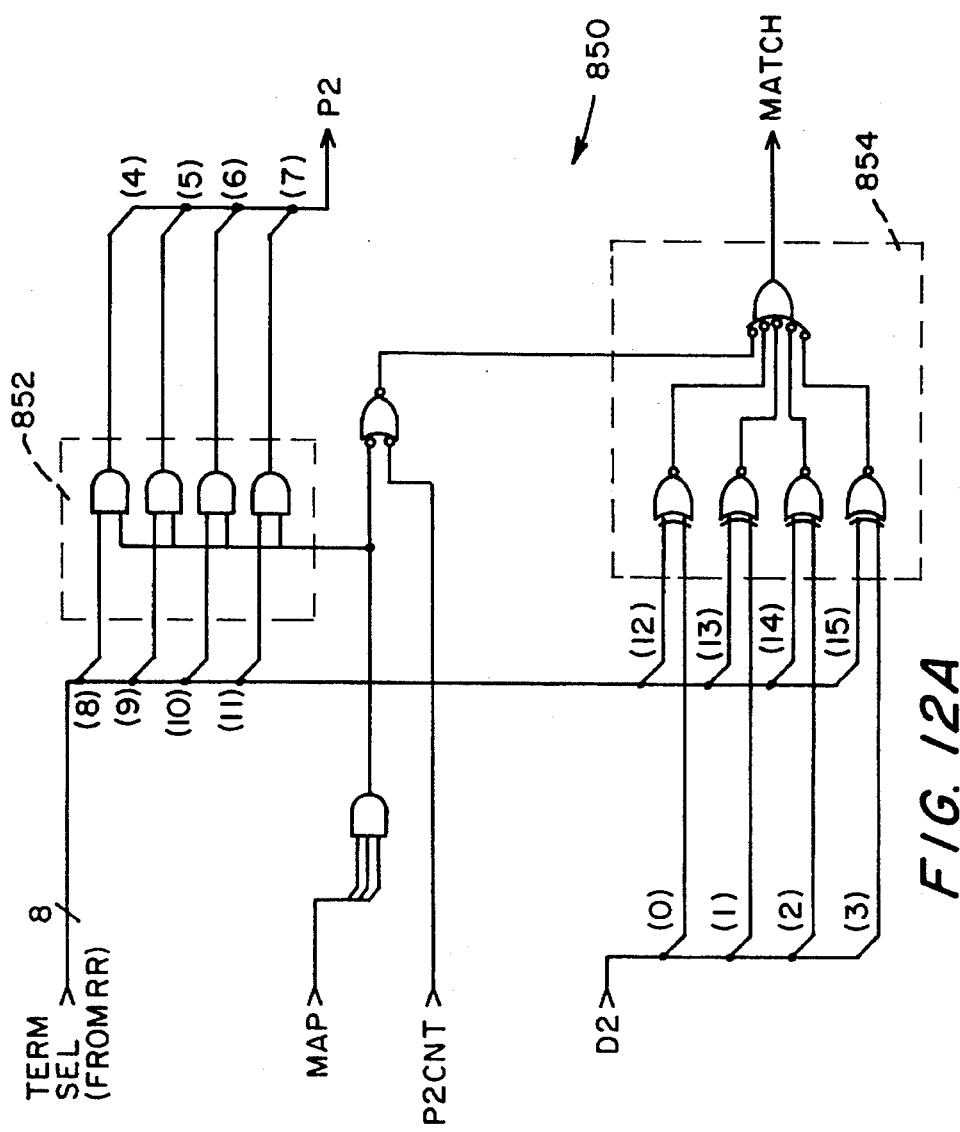

FIG. 12A shows the keyboard controller 850 of FIG. 3. The keyboard controller 850 is particularly effective in systems which require ready interface to a keypad. As shown in FIG. 3, the port D2 of the fuzzy microcontroller 50 can be configured as a sixteen-key keypad interface, whereby port D2 operates as an 8-channel TDM interface to the keypad 860. As shown in FIGS. 12A and 12B, the keypad 860 is coupled to the bus P2, which strobes the keypad 860 which is preferably configured in a 4×4 matrix. The P2CNT signal from the device configuration register of the control circuit 900 configures the bus D2 as a keypad I/O port. The bus P2 is coupled to bits 4–7 of port 2 which are driven by bits 8–11 (TERM SEL) of the rule register signal RR being processed, respectively. The AND gate array 852 acts as a keypad driver in accordance with the keypad mode being selected by bits 16–18 (MAP). The bits 0–3 of the input port D2 are compared against bits 12–15 (TERM SEL) of the rule register signal RR by a comparator 854 to determine if a match as occurred. If the comparator 854 determines a match, a MATCH signal is output to the minimum comparator 500 for processing.

When the keypad mode is used, an entire rule register is dedicated to keypad processing because all the bits of the terms field (bits 8–15) are used for the keypad. Therefore, in most cases, bit 21 (CON) of the rule register will be enabled to concatenate the rule dedicated for keypad processing with other rules.

Figure 13:
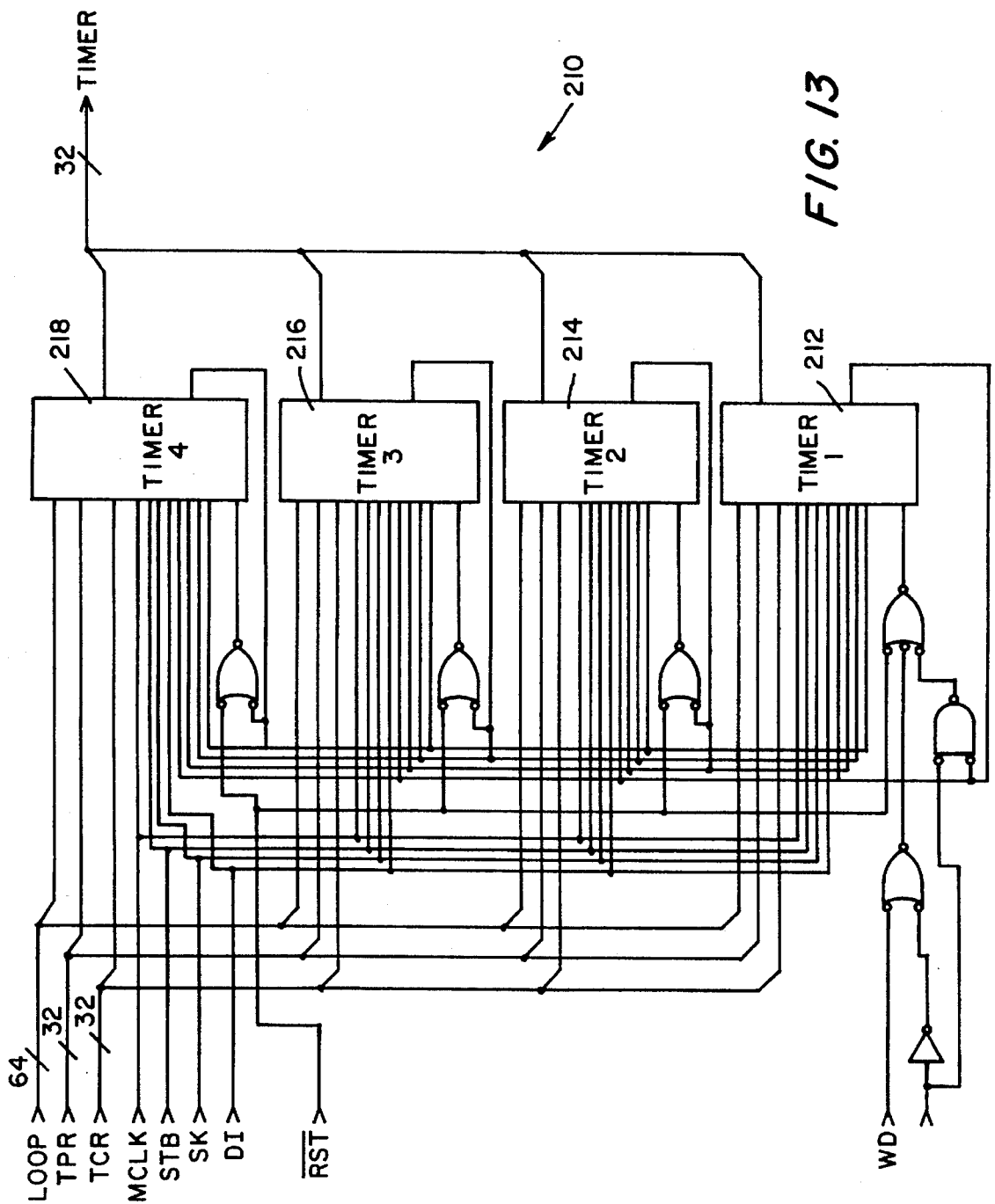
FIG. 13 discloses a block diagram of the timer processor of FIG. 3.

FIG. 13 discloses the timer processor 210. As shown in FIG. 13, the timer processor 210 includes four 8-bit programmable timers 212, 214, 216 and 218. Each of the timers can receive inputs from the other timers, the master clock (MCLK), the output strobe (STB), the serial clock (SK), the serial data input (DI), or the loop-back input from the output processor 800 (LOOP). The outputs of the timers are supplied to the other corresponding timers and are output as a 32-bit signal (TIMER) to the input processor 100, enabling time-varying membership functions when the timer outputs are used as floating centers for fuzzifiers.

Each timer is also provided with a TPR signal from a corresponding timer preload register in the control circuit 900. Each value in the timer preload register determines the maximum count constituting a timeout. Upon reset or timeout, the value of the TPR signal will be reloaded into the corresponding counter for use in the next subsequent cycle if the bit 0 of the respective timer control register equals "0" (see below).

Each of the timers 212, 214, 216 and 218 receive configuration data (TCR) from a corresponding timer control register 916 in the control circuit 900. Bit 0 (IN SEL) of the TCR signal identifies the source to load the counters: if IN SEL=0, the source is initial downloaded data; if IN SEL=1, the source is from the LOOP input from the output processor 800, whereby bits 0–7 of the loop-back signal are coupled to the timer 212, bits 8–15 of the loop-back signal are coupled to the timer 214, bits 16–23 of the loop-back signal are coupled to the timer 216, and bits 24–31 of the loop-back signal are coupled to the timer 218.

Bits 1–3 (CLK SEL) of the TCR signal identify the clock source for the given timer. The CLK SEK values 0–7 correspond to the following sources, respectively: timer 212, timer 214, timer 216, timer 218, master clock (MCLK), strobe (STB), serial clock (SK), and the data input (DI). Further, if a clock is selected from the same timer, the timer becomes disabled.

Bits 4–7 (% N) represent a scalar value used to divide the input clock source, prior to applying the clock to the timer.

The timer 212 may also be selected as a watchdog timer to prevent hang-up of the microcontroller 50. If bit 3 of the device configuration register is set, the timer 212 will count until a watchdog timeout occurs or a watchdog load is used, reloading the timer preload value. Upon a watchdog timeout, the value of the timer will remain at 0 until either a watchdog load occurs or a reset is asserted. The Watchdog Halt bit (WDHLT bit-4), when set, causes the microcontroller 50 to halt all processing should a timeout occur. A reset is then required to remove the device from the halted condition.

Figure 15:
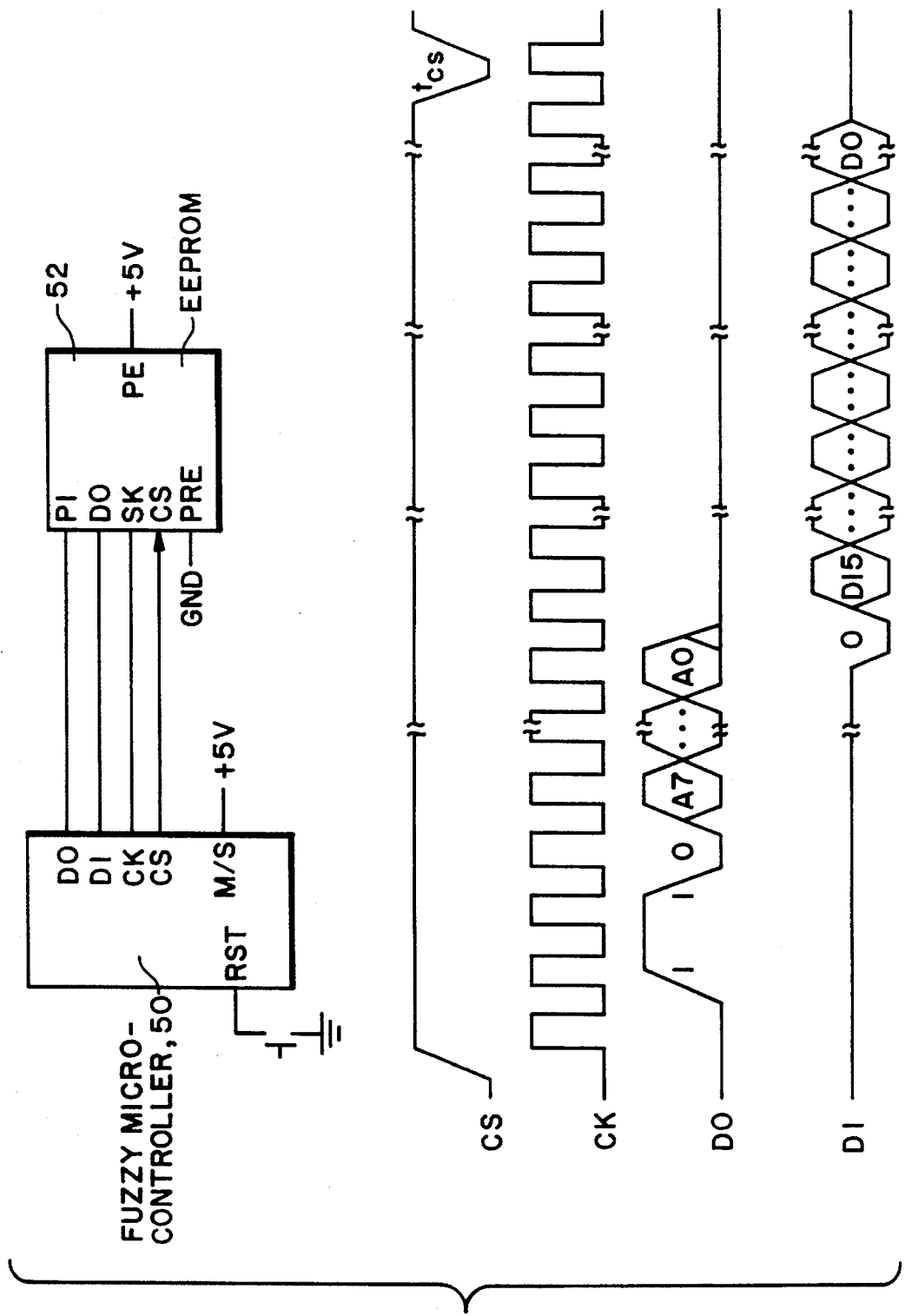
FIG. 15 illustrates an implementation of the fuzzy microcontroller of the present invention in a master mode.

The fuzzy microcontroller of the present invention can be implemented on a VLSI chip and used in a stand-alone master-control mode or may supplant a microprocessor implementation. For example, FIG. 15 illustrates an implementation of the fuzzy microcontroller 50 in a master mode. A programmable memory, such as the EEPROM 52 may store all necessary configuration data, such as fuzzy parameter data and rule data. An exemplary EEPROM would be the F93CSXX series from National Semiconductor, Inc., Sunnyvale, Calif. The master mode is set by setting the M/$\overline{S}$ terminal of the fuzzy microcontroller 50 to +5 volts and initiating by setting the RST terminal. The fuzzy microcontroller 50 outputs a chip select signal from the terminal CS, serial address data from the terminal DO, and a clock signal from the terminal CK, and receives serial data via a terminal DI. The protocol between the fuzzy microcontroller 50 and the EEPROM 52 may be, for example, the specification requirements of the 93C56 series devices from National Semiconductor, the requirements of which are incorporated herein by reference.

Such an implementation in the master mode would be advantageous in relatively inexpensive devices, such as home appliances or home heating systems.

Figure 16:
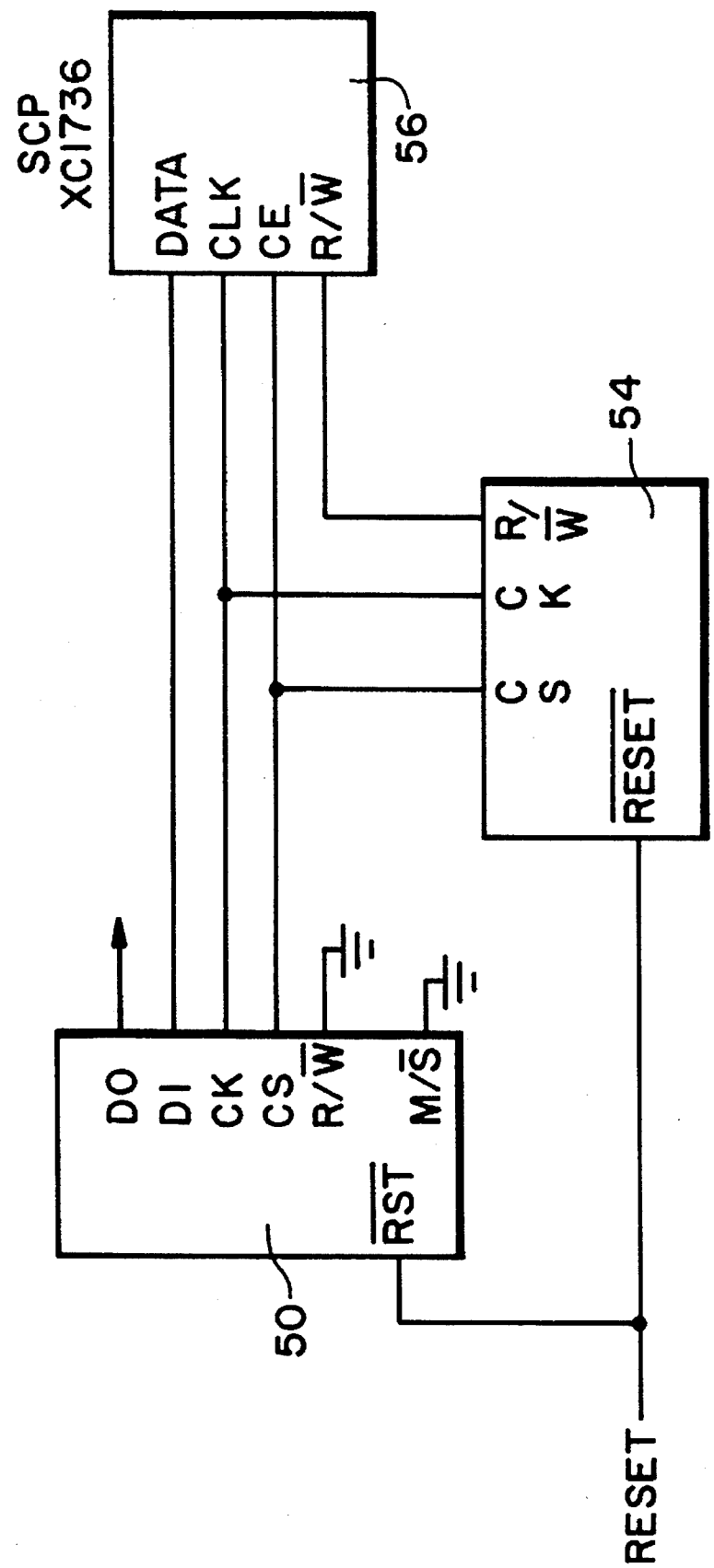
FIG. 16 illustrates an implementation of the fuzzy microcontroller of the present invention in a slave mode.

In more complex applications in which a microprocessor is already in use, the fuzzy microcontroller of the present invention may be implemented in a slave mode for the purposes of downloading configuration data, as shown in FIG. 16. The slave mode in the fuzzy microcontroller 50 is set by grounding the M/$\overline{S}$ terminal to zero volts; as a result, the terminals CS and CK are responsive to signals externally supplied by a microprocessor 54, which also supplies a read/write (R/$\overline{W}$) signal to the memory 56. Thus, the present invention is compatible with microprocessor-based systems, and may be reset by the microprocessor 54 as needed.

The fuzzy microcontroller of the present invention provides efficient control using fuzzy logic, with high processing rates on the order of 30 million rules/second. The fuzzy microcontroller also provides an efficient method for compressing input and output data by time division multiplexing. Further, the fuzzy microcontroller provides a fuzzifying arrangement (apparatus and method) which is easy to implement by avoiding the necessity of determining a shape of a membership function. The availability of a floating fuzzifier, whereby a center is defined on the basis of a second input, enables more complex membership functions to be easily implemented. Further, the fuzzy microcontroller provides a multipath feedforward network which asynchronously determines a minimum rule term using a minimum amount of circuitry, thereby minimizing space on an integrated circuit and reducing cost. Finally, the fuzzy microcontroller provides a novel method for determining the optimum rule among a set of rules for an output, in response to fuzzified inputs.

Figure 14A:
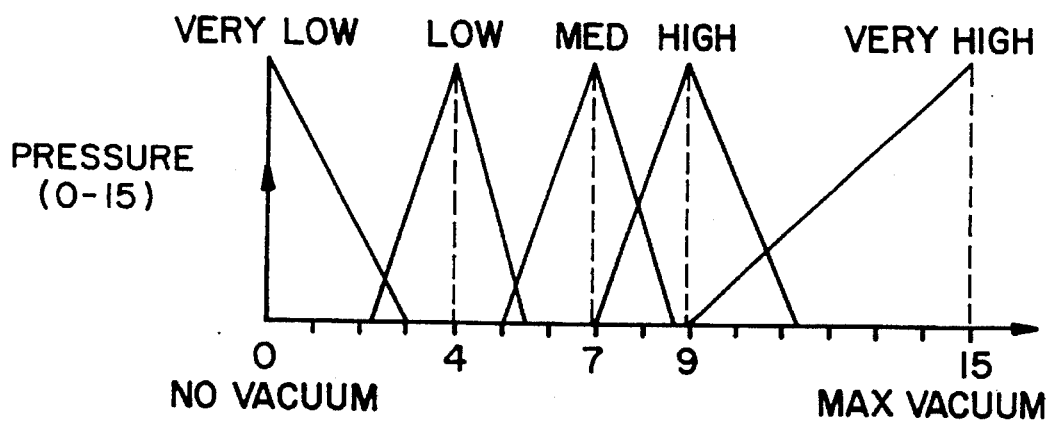
FIGS. 14A, 14B and 14C illustrate exemplary membership functions for an application of the fuzzy microcontroller of the present invention.
Figure 14B:
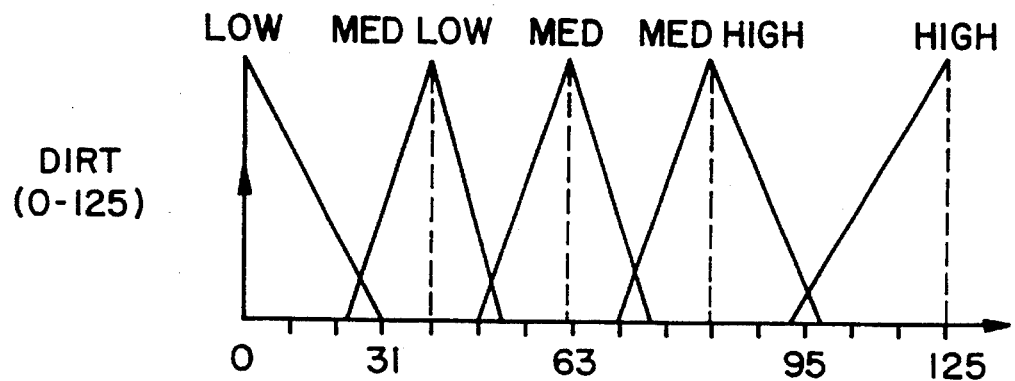
Figure 14C:
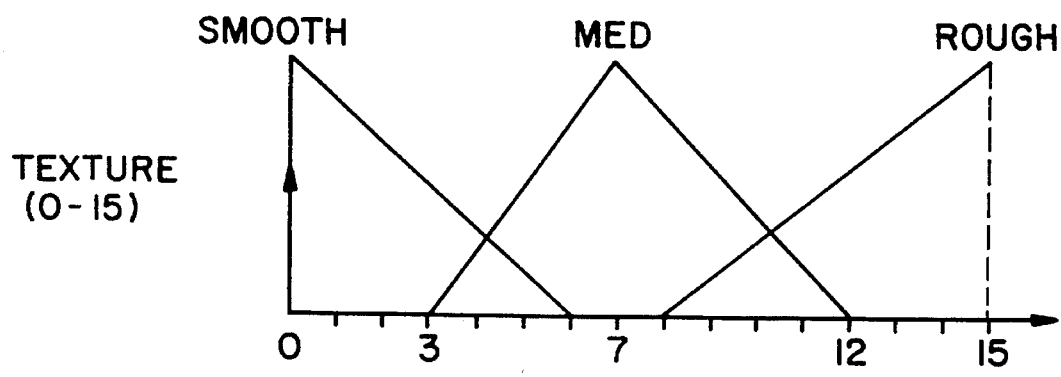

The operation of the fuzzy microcontroller of the present invention will become more apparent with reference to FIGS. 14A, 14B and 14C, which illustrate an application of the fuzzy microcontroller in controlling a vacuum cleaner. Specifically, FIGS. 11A, 11B and 11C each show an input to the fuzzy microcontroller along the X axis (e.g., pressure, dirt and texture), along with a plurality of fuzzifiers for classifying the input data.

As shown in FIG. 14A, the vacuum pressure input may be in one or more of five fuzzy sets: very low, low, medium, high or very high. Similarly, the inputs for dirt and texture (as measured by corresponding sensors) have their respective fuzzy sets as shown in FIGS. 14B and 14C, respectively.

Assuming the vacuum cleaner has three outputs to be controlled, namely VACUUM CONTROL, BEATER HEIGHT and BEATER SPEED, each output will have a number of associated rules to be applied, depending on the inputs pressure (P), dirt (D) and texture (T). Exemplary rules for the VACUUM CONTROL, BEATER HEIGHT and the BEATER SPEED are shown in Tables 5, 6 and 7, respectively.

TABLE 5

VACUUM CLEANER EXAMPLE

VACUUM CONTROL RULES

1. If (D is High) and (T is Rough) and (P is Low) then (Big Increment)

2. If (D is MHigh) and (T is Rough) and (P is Low) then (Increment)

3. If (D is MLow) and (T is Smooth) and (P is High) then (Decrement)

4. If (D is Low) and (T is Smooth) and (P is High) then (Big Decrement)

5. If (D is Low) and (P is High) then (Big Decrement)

TABLE 6

BEATER HEIGHT RULES

1. If (T is Smooth) and (D is High) then (Big Raise)
2. If (T is Smooth) and (D is MHigh) then (Raise)
3, If (T is Med) and (D is MHigh) then (Raise)
4. If (T is Med) and (D is MLow) then (Lower)
5. If (T is Smooth) and (D is Low) then (Big Lower)
6. If (T is Rough) and (D is MHigh) then (Raise)
7. If (T is Rough) and (D is High) then (Big Raise)
8. If (T is Smooth) and (D is MLow) then (Lower)

TABLE 7

BEATER SPEED RULES

1. If (T is Smooth) and (D is Low) then (Big Decrement Speed)

2. If (T is Med) and (D is Low) then (Decrement Speed)

3. If (T is Med) and (D is MHigh) then (Increment Speed)

4. If (T is Med) and (D is High) then (Big Increment Speed)

5. If (T is Rough) and (D is MHigh) then (Big Increment Speed)

6. If (T is Rough) and (D is High) then (Big Increment Speed)

The fuzzy microcontroller inputs the crisp inputs for pressure dirt and texture, and thereafter fuzzifies the data in accordance with the membership functions shown in FIGS. 14A–14C. The fuzzy microcontroller then determines the minimum rule term for each rule, and then determines the maximum minimum rule for each output. For example, assuming the input values for pressure, dirt and texture were "8", "40" and "5", respectively, the minimum comparator and maximum comparator would provide the following results as shown in Table 8 for the VACUUM CONTROL output.

TABLE 8

| Rule | Rule Term | Center – Input = Diff | Width | M | Min | Max of Min |
|---|---|---|---|---|---|---|
| 1. | D is High | 125 – 40 = 35 | 31 | 0 | | |
| | T is Rough | 15 – 5 = 10 | 7 | 0 | | |
| | P is Low | 4 – 8 = 4 | 2 | 0 | 0 | 0 |
| 2. | D is MHigh | 82 – 40 = 42 | 15 | 0 | | |
| | T is Rough | 15 – 5 = 10 | 7 | 0 | | |
| | P is Low | 4 – 8 = 4 | 2 | 0 | 0 | 0 |
| 3. | D is MLow | 40 – 40 = 0 | 15 | 31 | 0 | 0 |
| | T is Smooth | 0 – 5 = 5 | 6 | 26 | | |
| | P is High | 9 – 8 = 1 | 2 | 30 | 26 | 26 |
| 4. | D is Low | 0 – 40 = 40 | 31 | 0 | | |
| | T is Smooth | 0 – 5 = 5 | 6 | 26 | | |
| | P is High | 9 – 8 = 1 | 2 | 30 | 0 | 26 |
| 5. | D is Low | 0 – 40 = 40 | 31 | 0 | | |
| | P is High | 9 – 8 = 8 | 2 | 30 | 0 | 26 |

As shown in table 8 with respect to Rule 1, the inputs dirt, texture and pressure are not within the respective membership function widths for HIGH, ROUGH and LOW, respectively; as a result, the corresponding membership value $\mu$ (designated M in Table 8) for these fuzzy sets is forced to zero. However, the inputs do fall within the membership function widths for MLOW, SMOOTH and HIGH as shown for Rule 3 in Table 8. Since the minimum rule term for Rule 3 is "26", and since it is the relative maximum of minimum, the Rule 3 is selected as the optimal output for the output.

According to the present invention, the method of fuzzifying a crisp input may be easily implemented in an IC chip by determining the distance between the crisp input and the center of the respective membership function; if the distance is less than the width of the membership function, then the distance value is complemented to determine the alpha cut, or the membership value of the crisp input with respect to that fuzzy set. Since the shape of the membership function for the fuzzy set need not be determined, the fuzzifying method of the present invention can be easily implemented, which results in substantial cost savings in design development and circuit implementation.

The fuzzifier of the present invention includes an input control processor, a fuzzification interface, a programmable rule base, programmable or otherwise variable decision-making logic, a defuzzification interface, a configurable feed back path, an output control processor, or peripheral pre- and post- processing circuitry.

Further, one of ordinary skill in the art would realize that the floating fuzzifier concept can be applied to provide a membership function having a variable width, as opposed to a predetermined width.

The method of expanding input signals for mapping to a fuzzy set, and compressing output signals by time-division multiplexing enables the fuzzy control of a plurality of outputs on the basis of a corresponding plurality of inputs, thereby providing a more efficient control system. It will be recognized that the fuzzy microcontroller of the present invention is not limited to digital time-division multiplexed input and output signals. Rather, the present invention may be varied to include: singular or multiple inputs; bit serial or parallel formatted input data; multiplexed or non-multiplexed inputs; any means to connect the inputs to a selected fuzzification circuit; digital inputs having any number of bits of resolution; analog or digital inputs, or both mixed.

In addition, the fuzzy microcontroller of the present invention can be implemented in a cascaded arrangement, as shown in FIG. 17 in order to provide greater processing capacity for a larger number of inputs, outputs, or both. Those skilled in the art will realize the technique of controlling a plurality of the fuzzy microcontrollers in such a cascaded arrangement.

Those skilled in the art of fuzzy logic will also appreciate that the programmable rule base for an output can include, but not be limited to have any number of rules, any number of terms in a rule, the use of any or all logical functions as sentence connective operators, a permanent or volatile rule memory with on-chip or external rule storage.

Finally, those skilled in the art of fuzzy logic will appreciate that techniques for the determination of an optimum output, also known as "defuzzification" include but are not limited to defuzzification by the Mean of Maximum method, the Maximum method, the Center of Area or Center of Gravity methods, or equivalent methods thereof.

Although not as efficient, one skilled in the art will appreciate that the multipath feedforward network of the present invention may be replaced with a neural network having the input weights and the threshold values of each neuron adjusted accordingly.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A fuzzy logic microcontroller for controlling a device in response to at least one crisp input signal, comprising:
    means for mapping said crisp input signal to at least one fuzzy set, each fuzzy set having a membership function having a predetermined width and a center,
    means for fuzzifying said crisp input signal to obtain fuzzified input signals, said fuzzifying means comprising:
        means for determining a distance of said crisp input from said center of each of said membership functions, and
        means for linearly complementing each of said distances relative to said corresponding width of said membership function in accordance with a polarity of said membership function, said complemented distance being output as said fuzzified input signal;
    means for executing an optimized rule in accordance with said fuzzified input signals, said optimized rule being selected from a plurality of predetermined rules each having rule terms, said executing means comprising:
        means for determining a minimum rule term in accordance with said fuzzified input signals and a selected one of said predetermined rules, said selected rule being part of a group of rules corresponding to a control output;
        means for determining a maximum rule term among said minimum rule terms of said group of rules; and
        means for outputting an action value of said optimal rule corresponding to said maximum rule term as an output signal for said device to be controlled.

2. A fuzzy logic microcontroller as recited in claim 1, wherein said means for fuzzifying further includes means for supplying a selected input as said center of said membership function.

3. A fuzzy logic microcontroller as recited in claim 2, further comprising a timer processor for generating a time-variable signal, said time-variable signal being selected as said center of said membership function.

4. A fuzzy logic microcontroller as recited in claim 1, wherein said device is controlled in response to a plurality of time-division-multiplexed crisp input signals.

5. A fuzzy logic microcontroller as recited in claim 4, wherein said mapping means comprises:
    means for demultiplexing said time-division crisp input signals in response to a multiplexer address signal; and
    a selector circuit for supplying one of said demultiplexed input signals to said means for fuzzifying.

6. A fuzzy microcontroller as recited in claim 1, wherein said fuzzy microcontroller is operated in a master mode with an external memory.

7. A fuzzy microcontroller as recited in claim 1, wherein said fuzzy microcontroller is operated in a slave mode with a microprocessor.

8. A fuzzy logic microcontroller for controlling a device in response to at least one crisp input signal, said fuzzy logic microcontroller comprising:
    means for mapping said crisp input signal to at least one fuzzy set, each fuzzy set having a membership function having a predetermined width and a center;
    means for fuzzifying said crisp input signal to obtain fuzzified input signals, said fuzzifying means comprising:
        means for determining a distance of said crisp input from said center of each of said membership functions, and
        means for linearly complementing each of said distances relative to said corresponding width of said membership function in accordance with a polarity of said membership function, said complemented distance being output as said fuzzified input signal; and
    means for executing an optimized rule in accordance with said fuzzified input signals, said optimized rule being selected from a plurality of predetermined rules each having rule terms, said executing means comprising:
        means for determining a minimum rule term in accordance with said fuzzified input signals and a selected one of said predetermined rules, said selected rule being part of a group of rules corresponding to a control output,
        means for determining a maximum rule term among a plurality of said minimum rule terms corresponding to said group of rules,
        means for outputting an action value of said optimal rule corresponding to said maximum rule term as an output signal for said device to be controlled,
        a keyboard controller for controlling an external keyboard in accordance with one of said rules being processed, said keyboard controller outputting a match signal to said means for determining a minimum rule term, and
        means for outputting said action value in accordance with a rule mode of said optimized rule.

9. A fuzzy logic microcontroller as recited in claim 1, further comprising a timing generator for outputting a multiplexer address signal defining an I/O timeslot, said multiplexer address signal being output in accordance with a number of fuzzifiers and a number of rules to be processed for controlling said means for fuzzifying and said means for executing.

10. A fuzzy logic microcontroller as recited in claim 1, wherein said means for determining a minimum rule term includes a multipath feedforward network comprising:

a plurality of minimizing elements corresponding to said fuzzy sets, respectively, said minimizing elements each receiving said corresponding fuzzified input signals in accordance with said selected one of said rules and a feedback signal, each of said minimizing elements outputting a minimum output signal, said minimum output signal having lower order bits disabled when a corresponding significant bit of said input signal is different from a corresponding significant bit of said feedback signal indicating said feedback signal has a value less than a corresponding value of said input signal; and means for successively comparing corresponding significant bits of said minimum output signals of said respective minimizing elements and outputting said feedback signal in response thereto, said feedback signal representing, upon stabilization of said multipath feedforward network, said minimum rule term of said selected rule.

11. A fuzzy logic microcontroller as recited in claim 10, wherein each of said minimizing elements comprises:

a first network layer for comparing corresponding significant bits of said corresponding fuzzified input signal and said feedback signal, said first network layer outputting a disabling signal for said lower order bits when said corresponding significant bit of said fuzzified input signal is different from said corresponding bit of said feedback signal; and an output network layer for outputting said compared bits of said corresponding fuzzified input signal as said minimum output signal in accordance with said disabling signal and a rule-based disable signal supplied in accordance with said selected rule, said output network layer outputting said fuzzified input signal if, upon said stabilization, said output network layer has not received said disabling signal.

12. A fuzzy logic microcontroller as recited in claim 11, wherein said means for successively comparing comprises a plurality of NAND gates corresponding to each significant bit of said minimum output signals of said minimizing elements, each of said NAND gates outputting a corresponding significant bit of said feedback signal, said NAND gates determining a difference in value in said respective significant bits of said minimum output signals.

13. A fuzzy logic microcontroller as recited in claim 10, wherein said means for successively comparing comprises a plurality of NAND gates corresponding to each significant bit of said minimum output signals of said minimizing elements, each of said NAND gates outputting a corresponding significant bit of said feedback signal, said NAND gates determining a difference in value in said respective significant bits of said minimum output signals.

14. A method for fuzzifying a crisp input signal comprising the steps of:

defining a fuzzy set having a true and inverse polarity to have a predetermined width and a center, said center indicating a maximum membership value and said width indicating minimum membership values for said fuzzy set;

inputting said crisp input signal and said center to a subtractor;

outputting from said subtractor a distance signal representing a distance of said crisp input signal from said center of said fuzzy set;

outputting a similarity signal in response to said distance signal, said width of said fuzzy set and a polarity signal representing said polarity of said fuzzy set, said outputting step linearly complementing said distance signal with respect to said width of said fuzzy set so that:

said similarity signal represents a maximum value if said distance signal represents a minimum distance of said crisp input signal from said center and said polarity signal is true, said similarity signal represents a minimum value if said distance signal and said predetermined width indicate said crisp input signal exceeds said width of said membership function and said polarity signal is true, said similarity signal represents a maximum value if said distance signal and said predetermined width indicate said crisp input signal exceeds said width of said membership function and said polarity signal is inverse, and said similarity signal represents a minimum value if said distance signal represents a minimum distance of said crisp input signal from said center and said polarity signal is inverse.

15. A method for fuzzifying a crisp input signal for a fuzzy logic microcontroller, comprising the steps of:

defining a fuzzy set to have a center and a predetermined width and storing said width in a memory, said center indicating a maximum membership value and said width indicating minimum membership values for said fuzzy set;

inputting said crisp input signal and said center to a subtractor;

outputting from said subtractor a distance signal representing a distance of said crisp input signal from said center of said fuzzy set;

comparing said distance signal with said width stored in said memory and outputting a result;

outputting a similarity signal in response to said comparing result, said outputting step linearly complementing said result with respect to said width of said fuzzy set in accordance with a polarity of said fuzzy set so that:

said similarity signal is a maximum if said distance signal represents a minimum distance of said crisp input signal from said center, and said similarity signal is a minimum if said distance signal represents a maximum distance of said crisp input signal from said center.

* * * * *

UNITED STATES PATENT AND TRADEMARK OFFICE
CERTIFICATE OF CORRECTION

PATENT NO. : 5,459,816
DATED : October 17, 1995
INVENTOR(S) : Paul M. BASEHORE et al.

It is certified that error appears in the above-indentified patent and that said Letters Patent is hereby corrected as shown below:

Title Page, Item [*] should read as follows:

--The portion of the term of this patent subsequent to June 12, 2011 has been disclaimed.--

Signed and Sealed this

Third Day of February, 1998

Attest:

BRUCE LEHMAN

Attesting Officer

Commissioner of Patents and Trademarks